United States Patent
Chae

(10) Patent No.: US 11,928,199 B2
(45) Date of Patent: Mar. 12, 2024

(54) AUTHENTICATION SYSTEM, AUTHENTICATION DEVICE, AUTHENTICATION METHOD AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 381 days.

(21) Appl. No.: 17/418,855

(22) PCT Filed: Dec. 27, 2019

(86) PCT No.: PCT/JP2019/051569
§ 371 (c)(1),
(2) Date: Jun. 28, 2021

(87) PCT Pub. No.: WO2021/131060
PCT Pub. Date: Jul. 1, 2021

(65) Prior Publication Data
US 2022/0309138 A1 Sep. 29, 2022

(51) Int. Cl.
*G06F 21/32* (2013.01)
(52) U.S. Cl.
CPC .................................. *G06F 21/32* (2013.01)
(58) Field of Classification Search
CPC .. G06F 21/32; G06F 2221/2111; G06F 21/35; G06F 21/36; G06F 21/31; G07C 9/10; G07C 9/27; G07C 9/257
See application file for complete search history.

(56) References Cited

U.S. PATENT DOCUMENTS

| | | | |
|---|---|---|---|
| 9,430,629 B1 | 8/2016 | Ziraknejad et al. | |
| 10,154,372 B1* | 12/2018 | Vltavsky | G06Q 20/3221 |
| 10,192,375 B1* | 1/2019 | Yang | G07C 9/30 |
| 11,115,423 B2* | 9/2021 | DiAcetis | H04L 63/10 |

(Continued)

FOREIGN PATENT DOCUMENTS

| | | |
|---|---|---|
| CN | 109285255 A | 1/2019 |
| JP | 2008-071366 A | 3/2008 |

(Continued)

OTHER PUBLICATIONS

International Search Report for PCT/JP2019/051569, pp. 1-10. (see the transmittal letter).

(Continued)

*Primary Examiner* — Christopher A Revak
(74) *Attorney, Agent, or Firm* — HEA LAW PLLC

(57) ABSTRACT

An authentication system, including at least one processor configured to: perform authentication based on a first authentication method; record, when the authentication by the first authentication method is successful, an authenticated user and a location of the authenticated user in association with each other in a storage; perform authentication based on a second authentication method; and restrict successful authentication by the second authentication method when a user to be authenticated by the second authentication method and a location of the user to be authenticated are not associated with each other in the storage.

17 Claims, 15 Drawing Sheets

(56) References Cited

U.S. PATENT DOCUMENTS

| | | | | |
|---|---|---|---|---|
| 11,200,306 B1* | 12/2021 | Singh | | H04W 12/63 |
| 11,716,324 B2* | 8/2023 | Raounak | | H04L 63/107 |
| 2018/0232514 A1* | 8/2018 | Brown | | H04L 63/107 |
| 2019/0058702 A1* | 2/2019 | Kurian | | H04L 63/205 |
| 2019/0228141 A1 | 7/2019 | Shimizu et al. | | |
| 2019/0289017 A1* | 9/2019 | Agarwal | | H04L 9/0643 |
| 2019/0303603 A1* | 10/2019 | Courtney | | H04L 9/0637 |
| 2022/0394042 A1* | 12/2022 | Maoz | | H04L 63/20 |

FOREIGN PATENT DOCUMENTS

| | | | | | |
|---|---|---|---|---|---|
| JP | 2011-054120 A | | 3/2011 | | |
| JP | 2016-157294 A | | 9/2016 | | |
| JP | 2019-168915 A | | 10/2019 | | |
| KR | 2020-0053964 A | * | 5/2020 | | B60R 25/24 |
| WO | WO 2019/086416 A1 | * | 3/2019 | | G07C 9/00 |
| WO | 2019146136 A1 | | 8/2019 | | |
| WO | WO 2022/201490 A1 | * | 9/2022 | | G06F 21/32 |
| WO | WO 2022/208598 A1 | * | 10/2022 | | E05B 49/00 |

OTHER PUBLICATIONS

Office Action dated Mar. 9, 2021, for corresponding JP application No. 2020-564761. with the partial English translation, pp. 1-4.
Search Report dated Jan. 24, 2022, for corresponding EP Patent Application No. 19956184.6 pp. 1-8.

* cited by examiner

FIG.12

| USER ID | NAME | PASSWORD | FACE PHOTOGRAPH | FEATURE AMOUNT OF FACE | PASSCODE | REGISTRATION DATE AND TIME | TELEPHONE NUMBER | EMAIL ADDRESS | TOKEN |
|---|---|---|---|---|---|---|---|---|---|
| u00001 | A | ******* | aaa.jpg | (a1,a2,a3,····) | 1427 | 2019/6/20 16:43:51 | 090-1234-5678 | aaa123@mailadd.com | xb23ac |
| u00002 | B | ****** | bbb.jpg | (b1,b2,b3,·····) | 1427 | 2019/3/12 11:20:05 | 080-1876-5234 | 987bbb@abcmail.jp | jab15z |
| u00003 | C | ******** | ccc.jpg | (c1,c2,c3,····) | 9128 | 2019/6/5 21:15:41 | 03-9999-1111 | ccc555ccc@xyzfirm.com | 1ca7dk |
| ·· | · | · | · | · | · | · | · | · | · |

| LOCATION ID | AREA NAME | USER ID |
|---|---|---|
| p00000 | A0 | u00001 |
| | | u00003 |
| | | u00012 |
| | | ⋮ |
| p00001 | A1 | u00001 |
| | | u00002 |
| | | u00005 |
| | | ⋮ |
| p00002 | A2 | u00005 |
| | | u00017 |
| | | u00022 |
| | | ⋮ |
| ⋮ | ⋮ | ⋮ |

DB2

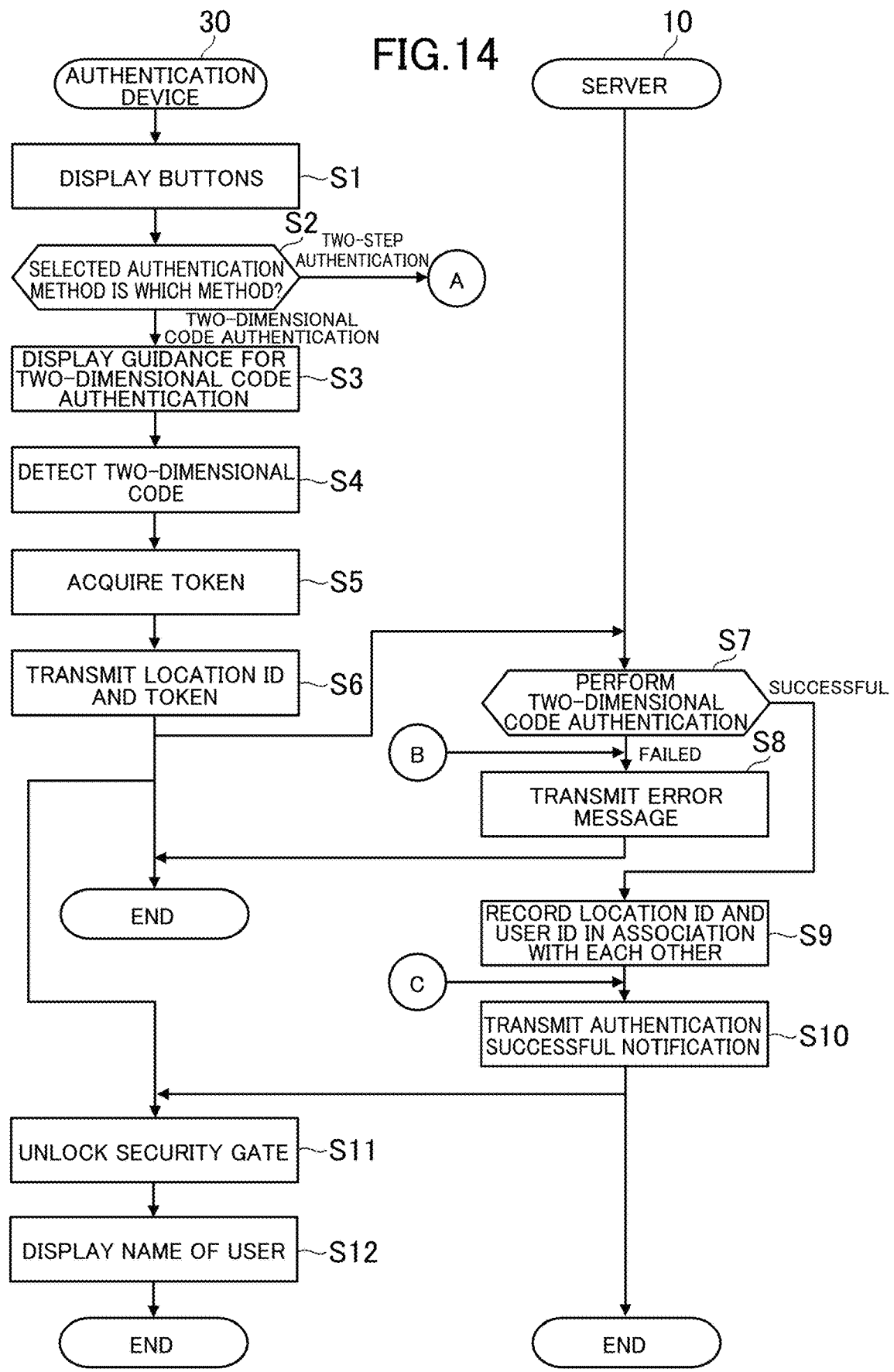

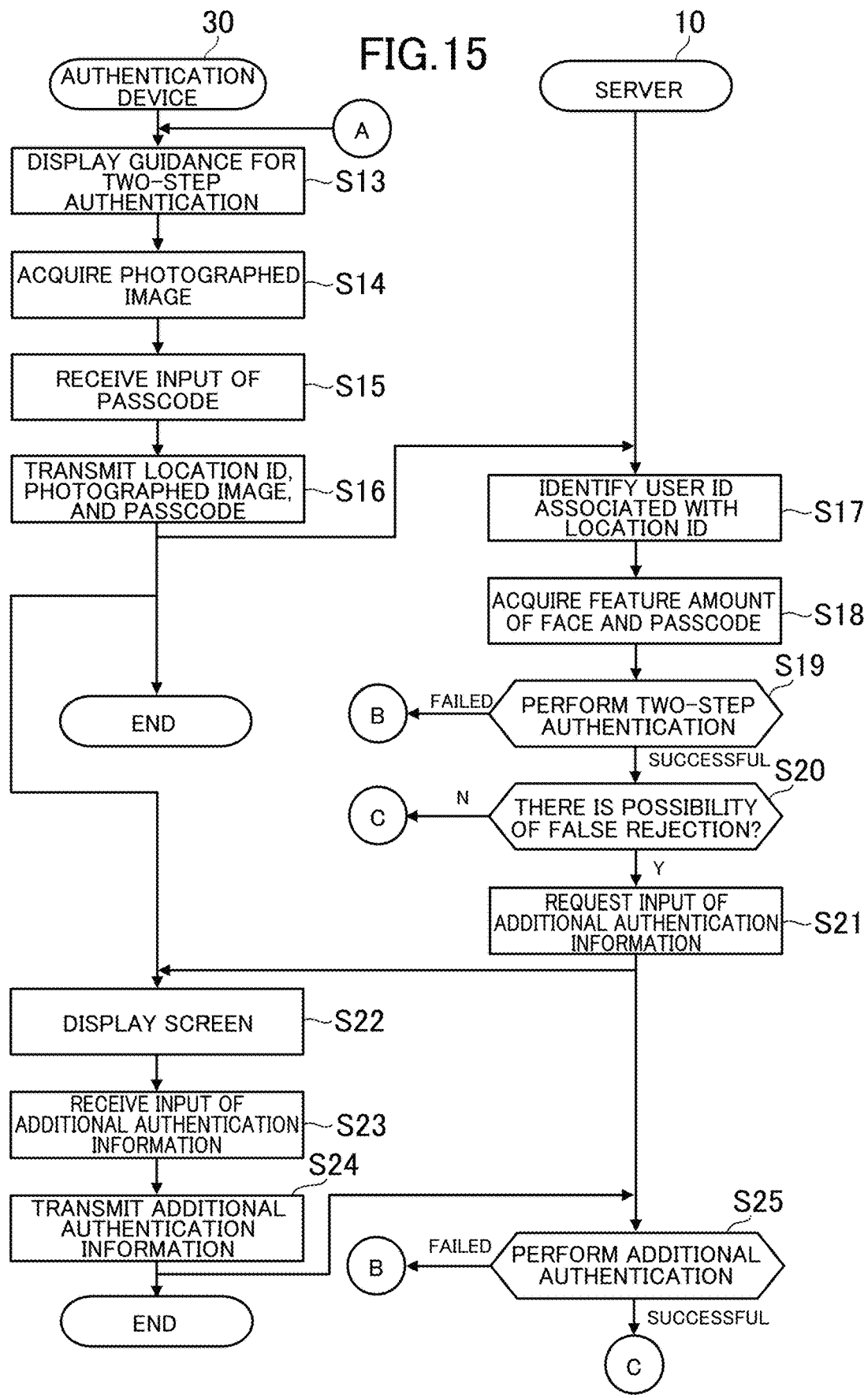

AUTHENTICATION SYSTEM, AUTHENTICATION DEVICE, AUTHENTICATION METHOD AND PROGRAM

CROSS REFERENCE TO RELATED APPLICATIONS

This application is a National Stage of International Application No. PCT/JP2019/051569 filed on Dec. 27, 2019. The contents of the above document are incorporated herein by reference in its entirety.

TECHNICAL FIELD

The present disclosure relates to an authentication system, an authentication device, an authentication method, and a program.

BACKGROUND ART

There has hitherto been known an authentication technology for preventing impersonation by a third party. For example, in Patent Literature 1, there is described a system in which face photographs having a plurality of patterns are registered in advance, and face authentication is executed by using a face photograph having a suitable pattern.

CITATION LIST

Patent Literature

[PTL 1] JP 2008-071366 A

SUMMARY OF INVENTION

Technical Problem

However, in the face authentication described in Patent Literature 1, a determination is performed based on similarity between face photographs having a plurality of patterns registered in advance and the face photograph photographed at the time of authentication. Therefore, when the face of a third party is similar, regardless of the pattern of the face photograph that is used, authentication may be successful. As a result, there are cases in which it is not possible to prevent impersonation by a third party, and security may not be sufficiently enhanced.

It is an object of the present disclosure to provide an authentication system, an authentication device, an authentication method, and a program, which are capable of sufficiently enhancing security.

Solution to Problem

According to one aspect of the present invention, there is provided an authentication system including: first authentication means for performing authentication based on a first authentication method; recording means for recording, when the authentication by the first authentication method is successful, an authenticated user and a location of the authenticated user in association with each other in storage means; second authentication means for performing authentication based on a second authentication method; and restriction means for restricting successful authentication by the second authentication method when a user to be authenticated by the second authentication method and a location of the user to be authenticated are not associated with each other in the storage means.

According to one aspect of the present invention, there is provided an authentication device included in the authentication system described above or described below, or an authentication device communicable to and from the authentication system described above or described below, the authentication device including: transmission means for transmitting information required for the authentication; and processing execution means for executing predetermined processing when the authentication is successful.

According to one aspect of the present invention, there is provided an authentication method including: a first authentication step of performing authentication based on a first authentication method; a recording step of recording, when the authentication by the first authentication method is successful, an authenticated user and a location of the authenticated user in association with each other in storage means; a second authentication step of performing authentication based on a second authentication method; and a restriction step of restricting successful authentication by the second authentication method when a user to be authenticated by the second authentication method and a location of the user to be authenticated are not associated with each other in the storage means.

According to one aspect of the present invention, there is provided a program for causing a computer to function as: first authentication means for performing authentication based on a first authentication method; recording means for recording, when the authentication by the first authentication method is successful, an authenticated user and a location of the authenticated user in association with each other in storage means; second authentication means for performing authentication based on a second authentication method; and restriction means for restricting successful authentication by the second authentication method when a user to be authenticated by the second authentication method and a location of the user to be authenticated are not associated with each other in the storage means.

According to one aspect of the present invention, in the authentication by the second authentication method, input authentication information and registered authentication information are compared with each other, the restriction means is configured to: acquire, as a target of comparison with the input authentication information on the user to be authenticated, the registered authentication information on users associated with the location of the user to be authenticated; and restrict successful authentication by the second authentication method by avoiding using as the target of comparison the registered authentication information on users unassociated with the location of the user to be authenticated, and the second authentication means is configured to perform authentication based on the input authentication information on the user to be authenticated and the registered authentication information acquired as the target of comparison.

According to one aspect of the present invention, the first authentication means is configured to perform authentication of the user to be authenticated based on the first authentication method when the authentication by the second authentication method has failed, and the recording means is configured to record, when the authentication of the first authentication method is successful, the authenticated user to be authenticated and the location of the user to be authenticated in association with each other in the storage means.

According to one aspect of the present invention, the authentication system further includes: determination means for determining, when the user to be authenticated and the location of the user to be authenticated are associated with each other, whether there is a possibility that the user to be authenticated is authenticated as another user in the authentication by the second authentication method; and request means for requesting the user to be authenticated for authentication by the first authentication method or a third authentication method, when it is determined that there is the possibility that the user to be authenticated is authenticated as another user.

According to one aspect of the present invention, the recording means is configured to record, in the storage means, an area in which the user is present as the location of the user authenticated by the first authentication method, and the restriction means is configured to restrict successful authentication by the second authentication method when the user to be authenticated and an area in which the user to be authenticated is present are not associated with each other in the storage means.

According to one aspect of the present invention, the authentication system further includes third authentication means for performing, based on a third authentication method, authentication of the user to be authenticated when the authentication by the second authentication method has failed, and the authenticated user to be authenticated and the location of the user to be authenticated are unassociated with each other in the storage means even when the authentication by the third authentication method is successful.

According to one aspect of the present invention, the authentication system further includes reception means for receiving a selection of any one of the first authentication method and the second authentication method, the first authentication means is configured to perform authentication by the first authentication method when the first authentication method is selected, and the second authentication means is configured to perform authentication by the second authentication method when the second authentication method is selected.

According to one aspect of the present invention, the second authentication method includes an authentication method based on a similarity between pieces of authentication information and an authentication method based on a match between pieces of authentication information.

According to one aspect of the present invention, the authentication system includes a plurality of authentication devices each corresponding to one of the first authentication method and the second authentication method, the recording means is configured to record, in the storage means, a user authenticated by the first authentication method and a location of one of the plurality of authentication devices used in the authentication of the user in association with each other, and the restriction means is configured to restrict successful authentication by the second authentication method when the user to be authenticated and the location of one of the plurality of authentication devices used in the authentication of the user to be authenticated are not associated with each other.

According to one aspect of the present invention, the authentication by the first authentication method is authentication using a user terminal, and the authentication by the second authentication method is biometric authentication.

According to one aspect of the present invention, the authentication system further includes processing execution means for executing, when the authentication by the first authentication method or the authentication by the second authentication method is successful, payment processing based on payment information on the authenticated user.

Advantageous Effects of Invention

According to the present disclosure, it is possible to enhance the security sufficiently.

BRIEF DESCRIPTION OF DRAWINGS

FIG. 12 is a table for showing a data storage example of a user database.

FIG. 13 is a table for showing a data storage example of a location database.

FIG. 14 is a flowchart for illustrating an example of processing to be executed in this embodiment.

FIG. 15 is a flowchart for illustrating an example of processing to be executed in this embodiment.

DESCRIPTION OF EMBODIMENTS

1. Overall Configuration of Authentication System

Figure 1:
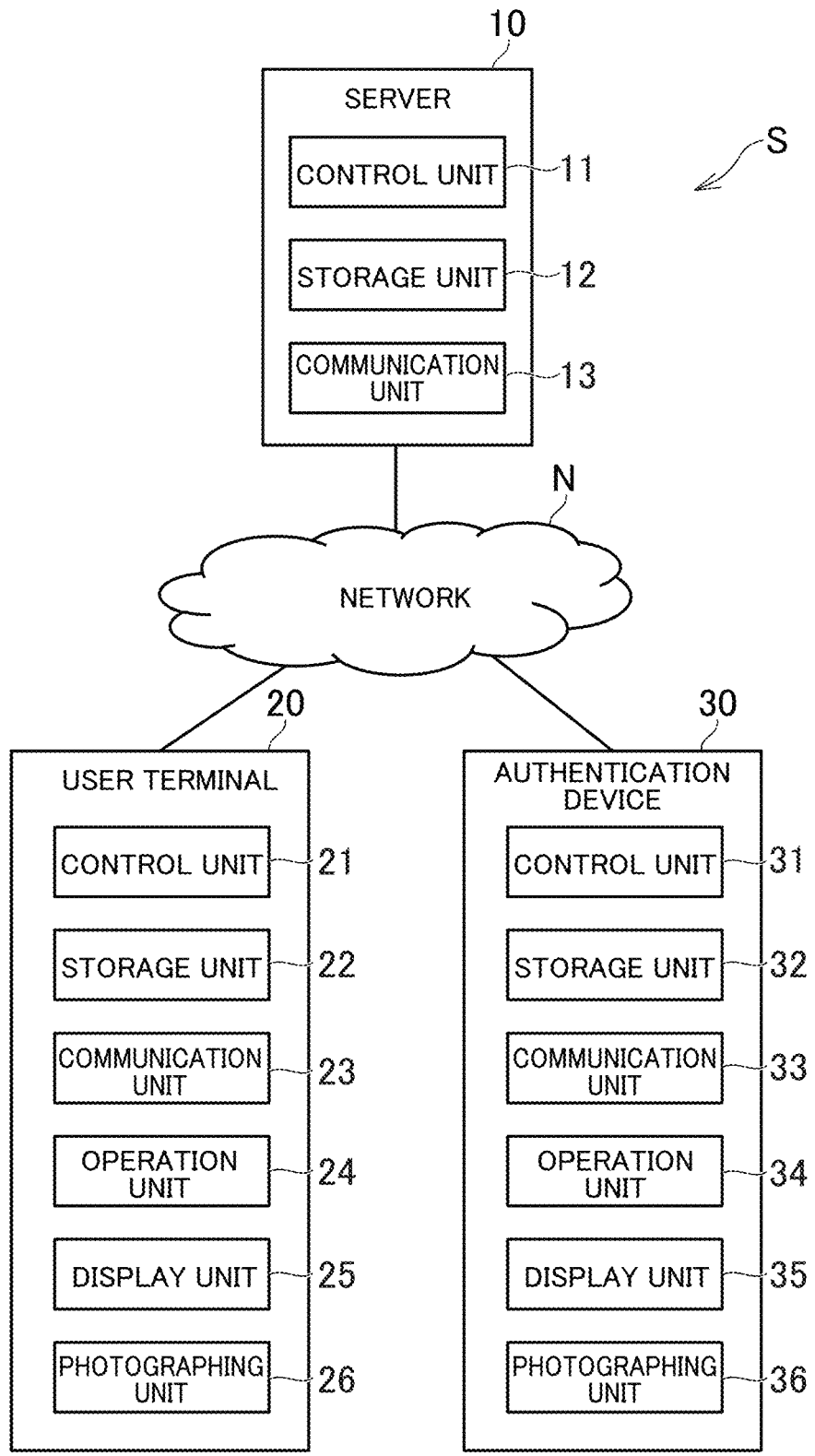
FIG. 1 is a diagram for illustrating an overall configuration of an authentication system.

There is now described an example of an embodiment of the present invention. FIG. 1 is a diagram for illustrating an overall configuration of the authentication system. As illustrated in FIG. 1, an authentication system S includes a server 10, a user terminal 20, and an authentication device 30, each of which can be connected to a network N, for example, the Internet. In FIG. 1, there is illustrated one server 10, one user terminal 20, and one authentication device 30, but there may be a plurality of each of those.

The server 10 is a server computer. The server 10 includes a control unit 11, a storage unit 12, and a communication unit 13. The control unit 11 includes at least one processor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive. The communication unit 13 is a communication interface for wired communication or wireless communication, and performs data communication via the network N.

The user terminal 20 is a computer to be operated by a user. For example, the user terminal 20 is a cell phone (including smartphones), a portable information terminal (including tablet computers and wearable terminals), or a personal computer. In this embodiment, the user terminal 20 includes a control unit 21, a storage unit 22, a communication unit 23, an operation unit 24, a display unit 25, and a photographing unit 26. The physical configuration of each of the control unit 21, the storage unit 22, and the communication unit 23 may be the same as those of the control unit 11, the storage unit 12, and the communication unit 13, respectively.

The operation unit 24 is an input device, and is, for example, a pointing device such as a touch panel and a mouse, a keyboard, or a button. The operation unit 24 transmits details of operation to the control unit 21. The display unit 25 is, for example, a liquid crystal display unit or an organic EL display unit. The display unit 25 displays an image in accordance with an instruction of the control unit 21.

The photographing unit 26 includes at least one camera. For example, the photographing unit 26 includes an image pickup element such as a CCD image sensor or a CMOS image sensor, and records an image picked up by the image pickup element as digital data. The image may be a still image or a moving image picked up continuously at a predetermined frame rate.

The authentication device 30 is a computer to be used for authentication. For example, the authentication device 30 is a cell phone, a portable information terminal, or a personal computer. In this embodiment, the authentication device 30 includes a control unit 31, a storage unit 32, a communication unit 33, an operation unit 34, a display unit 35, and a photographing unit 36. The physical configuration of each of the control unit 31, the storage unit 32, the communication unit 33, the operation unit 34, the display unit 35, and the photographing unit 36 may be the same as those of the control unit 11, the storage unit 12, the communication unit 13, the operation unit 24, the display unit 25, and the photographing unit 26, respectively.

Programs and data to be described as being stored into the storage units 12, 22, and 32 may be supplied thereto via the network N. Further, the respective hardware configurations of the computers described above are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to each of the computers through intermediation of the reading unit or the input/output unit.

2. Outline of Authentication System

The authentication system S is configured to execute authentication in order to confirm the validity of the user in a suitable situation. The authentication is an action of confirming whether or not the user has a predetermined qualification, and may be referred to as "other-party authentication" or "personal authentication." The authentication system S can execute various types of authentication. For example, the authentication system S can execute two-dimensional code authentication, biometric authentication, passcode authentication, password authentication, electronic stamp authentication, or countersign authentication.

Biometric authentication is an authentication method that uses a physical feature or behavioral characteristic of a human. Examples of biometric authentication that uses a physical feature includes face authentication, fingerprint authentication, DNA authentication, palm authentication, retina authentication, iris authentication, vein authentication, and voice authentication. Examples of biometric authentication that uses a behavioral feature include handwriting authentication, key stroke authentication, lip movement authentication, eye blinking authentication, and gait authentication.

In this embodiment, processing of the authentication system S is described by using a situation in which the user passes through a security gate as an example. The authentication system S is applicable to various situations, as described in modification examples of the present invention later, and the situations to which the authentication system S is applied are not limited to the example of this embodiment.

Figure 2:
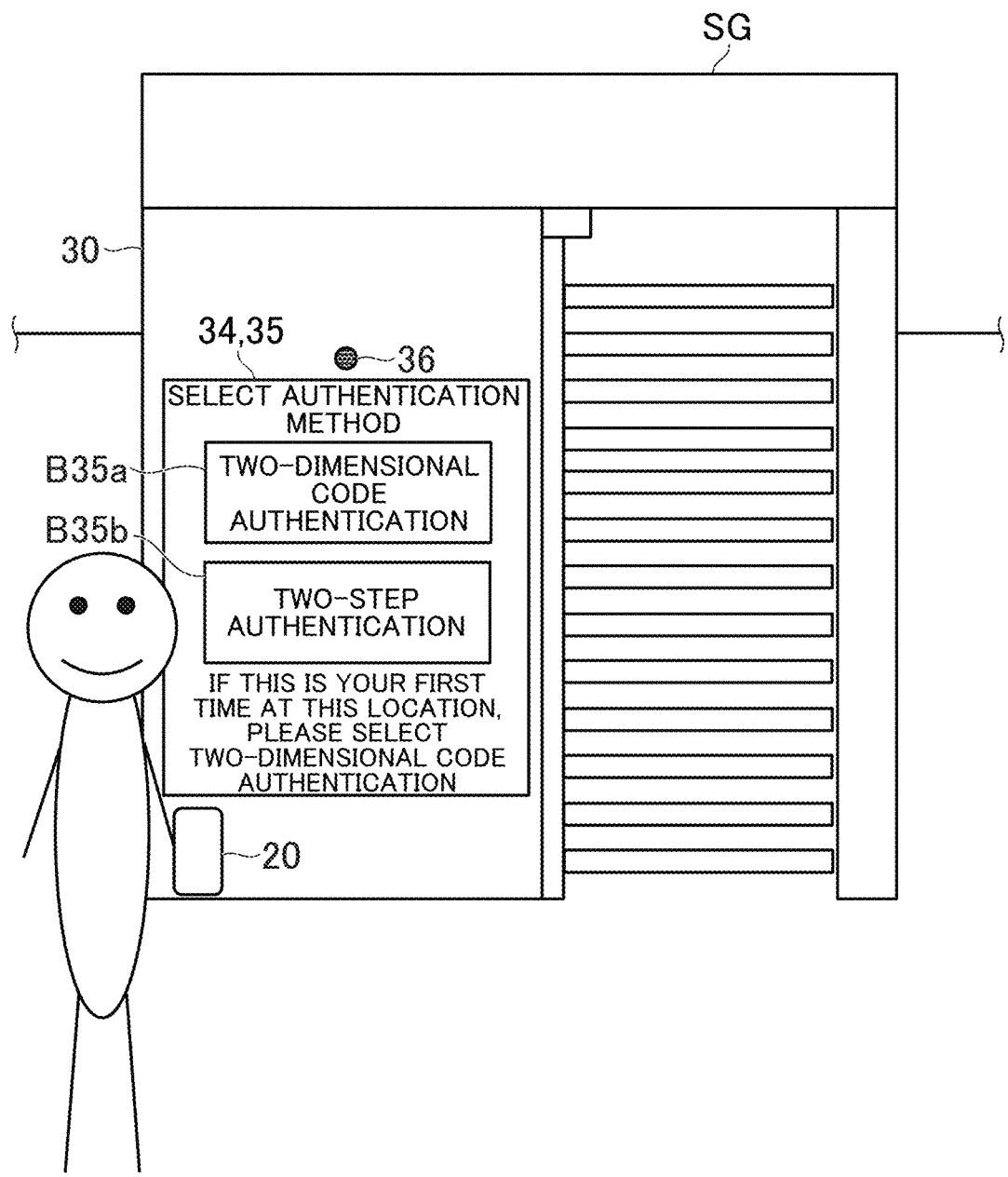
FIG. 2 is a diagram for illustrating an example of a situation in which the authentication system is used.

FIG. 2 is a diagram for illustrating an example of a situation in which the authentication system S is used. As illustrated in FIG. 2, a security gate SG includes a rotatable door, and is connected to the authentication device 30. The door of the security gate SG is locked by a lock mechanism, and is unlocked when user authentication is successful. When the lock is unlocked, the user can push the door to pass through the door. The door is locked again when the door is rotated by a predetermined angle. The door may be an opening and closing type of door, and the opening and closing may be controlled by an electronic lock.

For example, the security gate SG may be arranged at any facility, such as at a company for which the user works or at a public facility, and only those who are qualified to enter are allowed to pass through the security gate SG. The security gate SG is arranged at each of a plurality of locations. In this embodiment, a plurality of authentication methods are prepared, and the user can select the authentication method.

The authentication method is a type of the authentication. In this embodiment, there is described a case in which the user selects any one of two authentication methods is described, but the number of authentication methods may be three or more, and there may be a location at which only one authentication method can be used. Further, the authentication method may be automatically selected by the authentication system S in place of the user selecting the authentication method. The authentication method may be multi-step authentication. When the authentication method is multi-step authentication, a combination of the plurality of authentication methods corresponds to one authentication method.

In this embodiment, there is described a case in which the user selects any one of two authentication methods, that is, any one of two-dimensional code authentication and two-step authentication combining face authentication and passcode authentication. For example, the user performs predetermined use registration when using the authentication service provided by the authentication system S. In place of the user performing the use registration himself or herself, the use registration may be performed based on an operation by, for example, an operator in response to an application by the user for the use registration on a document. For example, a new user operates the user terminal 20 to upload his or her face photograph and a desired passcode together with his or her name, a password, and other such information to the authentication service provided by the authentication system S. When those pieces of information have been uploaded, the use registration is complete, and the user can use the authentication service.

As illustrated in FIG. 2, a button B35*a* for selecting the two-dimensional code authentication and a button B35*b* for selecting the two-step authentication are displayed on the display unit 35 of the authentication device 30. The user can select any one of the buttons B35*a* and B35*b*. For example, when the user selects the button B35*a*, the display unit 35 displays guidance for the two-dimensional code authentication.

Figure 3:
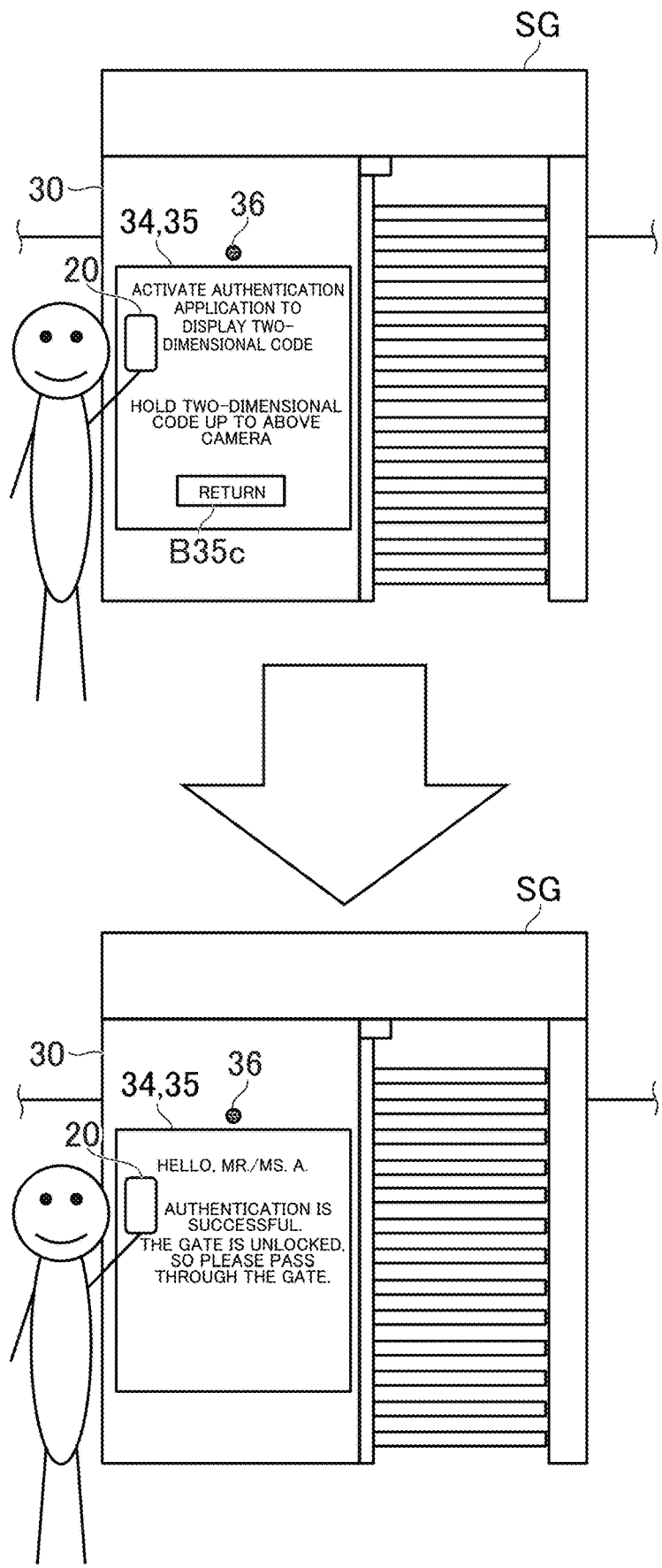
FIG. 3 is a diagram for illustrating how two-dimensional code authentication is executed.

FIG. 3 is a diagram for illustrating how the two-dimensional code authentication is executed. As illustrated in FIG. 3, the user causes the user terminal 20 to display a two-dimensional code in accordance with the guidance displayed on the display unit 35. The two-dimensional code includes information required for authentication. In this embodiment, a token is described as an example of this information. The token is one-time information capable of identifying a user ID. The two-dimensional code may also include information other than the token, for example, information on a user ID and a password. The two-dimensional code authentication may be implemented by using information other than the token.

For example, an application of the authentication service according to this embodiment is installed on the user terminal 20. When the application of the user terminal 20 is activated, the user terminal 20 acquires the token issued by the server 10, and a two-dimensional code including the token is displayed. The token may be stored in the user terminal 20 in advance.

The user brings the user terminal 20 displaying the two-dimensional code close to the photographing unit 36. When the photographing unit 36 has read the two-dimensional code, the authentication device 30 acquires the token included in the two-dimensional code and transmits the token together with a location ID for uniquely identifying the location of the authentication device 30 to the server 10. The server 10 receives those pieces of information, and executes the two-dimensional code authentication. When the two-dimensional code authentication is successful, the server 10 notifies the authentication device 30 of that fact. When the authentication device 30 receives the notification, the security gate SG is unlocked, and the user can pass through the security gate SG.

When a button B35*c* displayed on the display unit 35 of the authentication device 30 is selected before the two-dimensional code authentication is executed, the screen returns to the screen of FIG. 2. On the screen of FIG. 2, the user can select the button B35*b* for the two-step authentication to execute the two-step authentication. For example, when the user selects the button B35*b*, guidance for the two-step authentication is displayed on the display unit 35.

Figure 4:
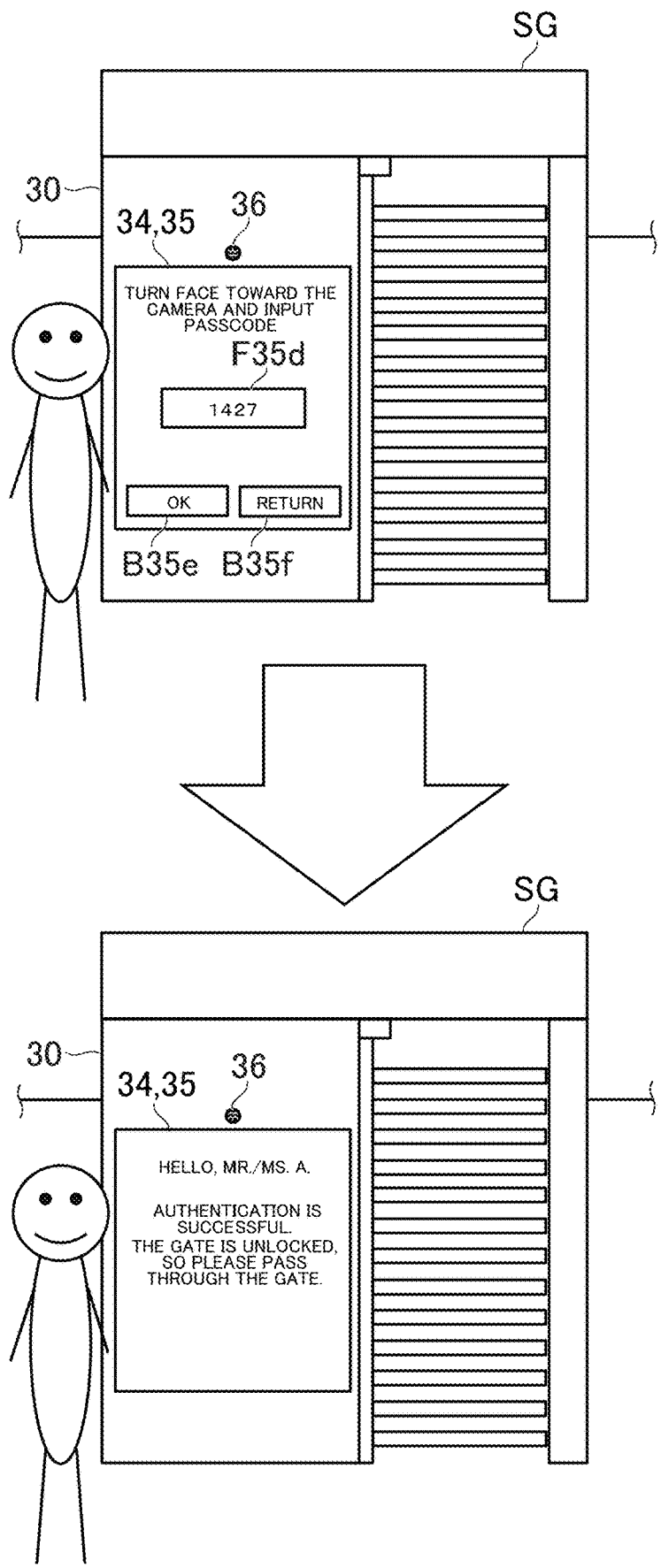
FIG. 4 is a diagram for illustrating how two-step authentication is executed.

FIG. 4 is a diagram for illustrating how the two-step authentication is executed. As illustrated in FIG. 4, the user causes the photographing unit 36 to photograph his or her face. The user operates the operation unit 34 to input his or her passcode into an input form F35*d* displayed on the display unit 35. When the user selects a button B35*e*, the image photographed by the photographing unit 36 and the passcode input to the input form F35*d* are transmitted to the server 10, and the two-step authentication including face authentication and passcode authentication is executed. As illustrated in FIG. 4, when the two-step authentication is successful, the security gate SG is unlocked, and the user can pass through the security gate SG.

As described above, in this embodiment, the user can select the authentication method he or she prefers from between two authentication methods. In the two-dimensional code authentication, the user is required to carry the user terminal 20. In contrast, in the two-step authentication, the authentication can be performed even when the user is not carrying anything, and hence the two-step authentication is more convenient for the user. However, when users having similar faces to each other have registered the same passcode, it may not be possible to discriminate which user is in front of the security gate SG. Moreover, there is also a possibility that the user in front of the security gate SG is authenticated as another user, and passes through the security gate SG by impersonating the another user.

In regard to this, one way to prevent a plurality of users having similar faces to each other from using the same passcode is to prompt the users to designate only a part of the passcode (for example, the last four digits of the passcode) at the time of use registration and to cause the authentication system S to generate the remaining part (for example, the first two digits of the passcode). However, in this case, the user is required to also remember the portion generated by the authentication system S, which is inconvenient.

Moreover, when a plurality of users having similar faces to each other use the same passcode, additional authentication may be performed in which the user is prompted to input information that is different among the users, for example, an email address or a telephone number. However, in this case as well, input for the additional authentication is required, which is inconvenient. Therefore, there is a demand for a method of enhancing security while preventing a decrease in convenience.

Therefore, in this embodiment, when a user successfully performs the two-dimensional code authentication at the security gate SG of a certain location, the user and the location are recorded in association with each other in the server 10 so that, from the next time and the subsequent times, the two-step authentication can be performed at that location. At a location where the user is performing authentication for the first time, the user is not allowed to use the two-step authentication, and is required to use the two-dimensional code authentication.

For example, even when users having similar faces to each other register the same passcode, it is not possible to impersonate another user unless the two-dimensional code authentication is successful at the same location as each other. Therefore, it is not required to request additional authentication, and it is possible to enhance security while preventing a reduction in convenience. When a user successfully performs the two-dimensional code authentication at a certain location, from the next time and the subsequent times, the user can pass through the security gate SG even when he or she goes to the location without carrying anything.

Figure 5:
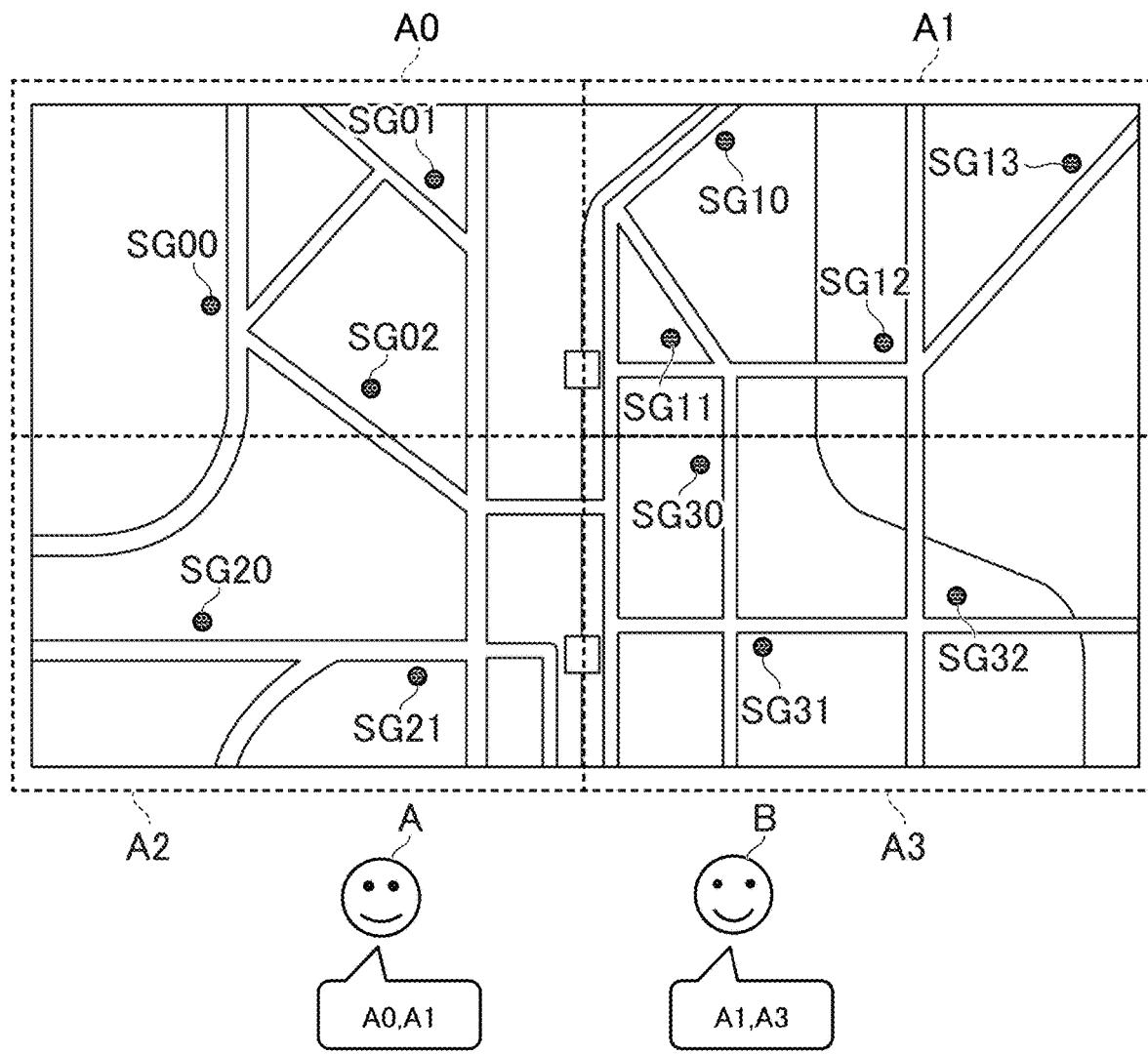
FIG. 5 is a diagram for illustrating an example of processing of the authentication system.

FIG. 5 to FIG. 9 are diagrams for illustrating examples of processing of the authentication system S. As illustrated in FIG. 5, in this embodiment, a security gate SG is arranged at each of a plurality of locations. In the example of FIG. 5, security gates SG00 to SG32 are arranged in each of areas A0 to A3. In the following description, when the areas A0 to A3 are not to be distinguished, the areas are simply referred to as "area A," and when the security gates SG00 to SG32 are not to be distinguished, the security gates are simply referred to as "security gate SG."

In the example of FIG. 5, users A and B have similar faces to each other and have registered the same passcode. For example, it is assumed that the user A has successfully performed the two-dimensional code authentication at a security gate SG in the areas A0 and A1. Therefore, the user A can perform the two-step authentication at the security gates SG of the areas A0 and A1. It is not required that the user A successfully perform the two-dimensional code authentication at all of the security gates SG in the areas A0 and A1, it is sufficient that the user A successfully performs the two-dimensional code authentication at any one of the security gates SG in the same area. For example, when the user A has successfully performed the two-dimensional code authentication at the security gate SG00, the user A may perform the two-step authentication not only at the security gate SG00 but also at the other security gates SG01 and SG02 in the same area.

As another example, it is assumed that the user B has successfully performed the two-dimensional code authentication at a security gate SG in the areas A1 and A3. Therefore, the user B can perform the two-step authentication at the security gates SG in the areas A1 and A3. It is not required that the user B successfully perform the two-dimensional code authentication at all of the security gates SG of the areas A1 and A3, it is sufficient that the user B successfully performs the two-dimensional code authentication at any one of the security gates SG in the same area. For example, when the user B has successfully performed the two-dimensional code authentication at the security gate SG10, the user B may perform the two-step authentication not only at the security gate SG10 but also at the other security gates SG11 to SG13 in the same area.

Figure 6:
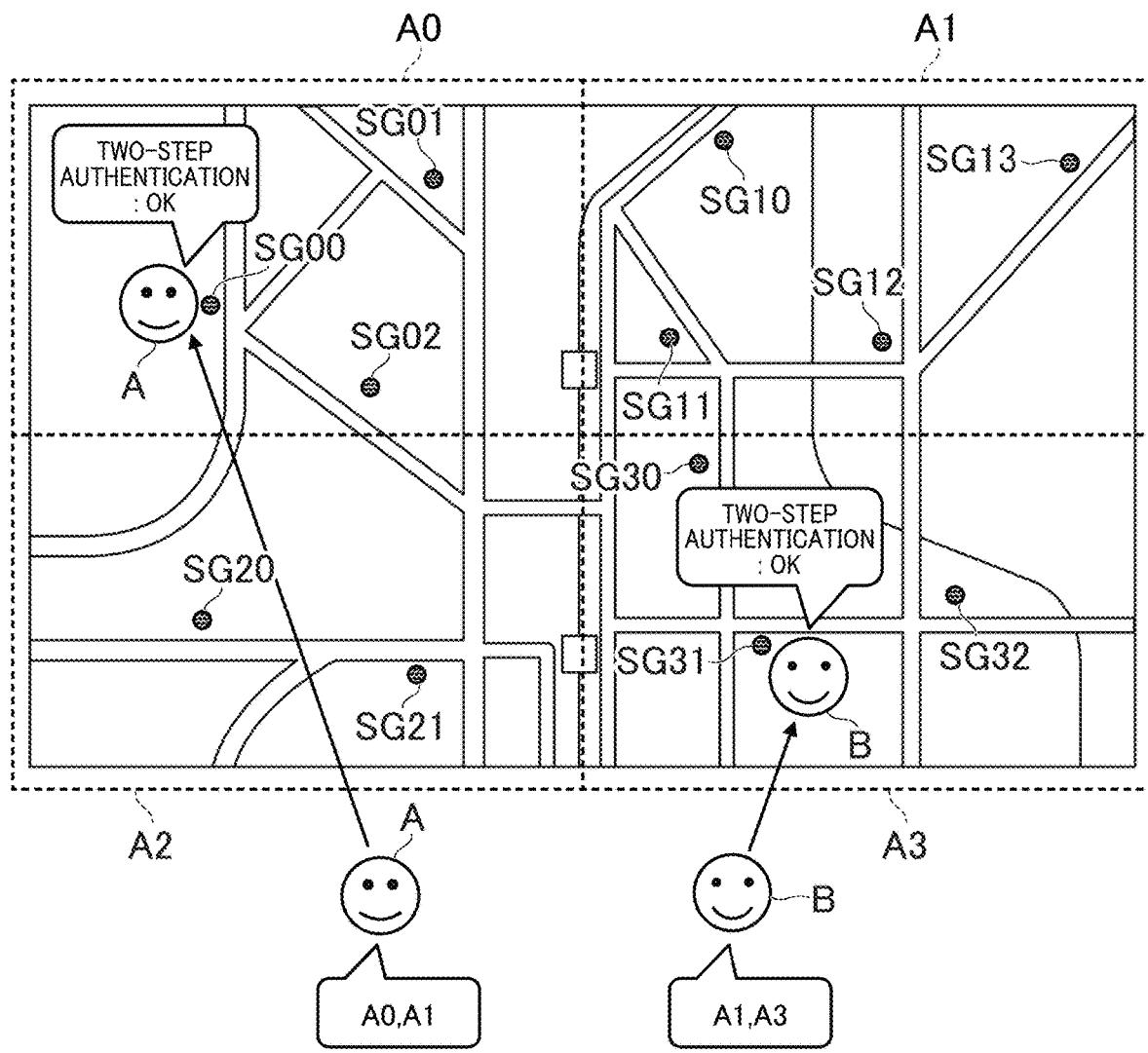
FIG. 6 is a diagram for illustrating an example of processing of the authentication system.

As illustrated in FIG. 6, for example, when the user A selects the button B35*b* at the security gate SG00 of the area A0, the two-step authentication can be performed. The area A0 is an area in which the user B has not yet performed the two-dimensional code authentication (area that he or she has not visited yet). In this case, the server 10 does not have a record indicating that the user B has performed the two-dimensional code authentication in the area A0, and therefore when the user A tries to perform the two-step authentication in the area A0, he or she is not authenticated as the user B. Therefore, even when the two-step authentication is performed, the server 10 can identify that the user A is trying to pass through the security gate SG00.

Further, for example, when the user B selects the button B35*b* at the security gate SG31 of the area A3, the two-step authentication can be performed. The area A3 is an area in which the user A has not yet performed the two-dimensional code authentication (area that he or she has not visited yet). In this case, the server 10 does not have a record indicating that the user A has performed the two-dimensional code authentication in the area A3, and therefore when the user B tries to perform the two-step authentication in the area A3, he or she is not authenticated as the user A. Therefore, even when the two-step authentication is performed, the server 10 can identify that the user B is trying to pass through the security gate SG31.

Figure 7:
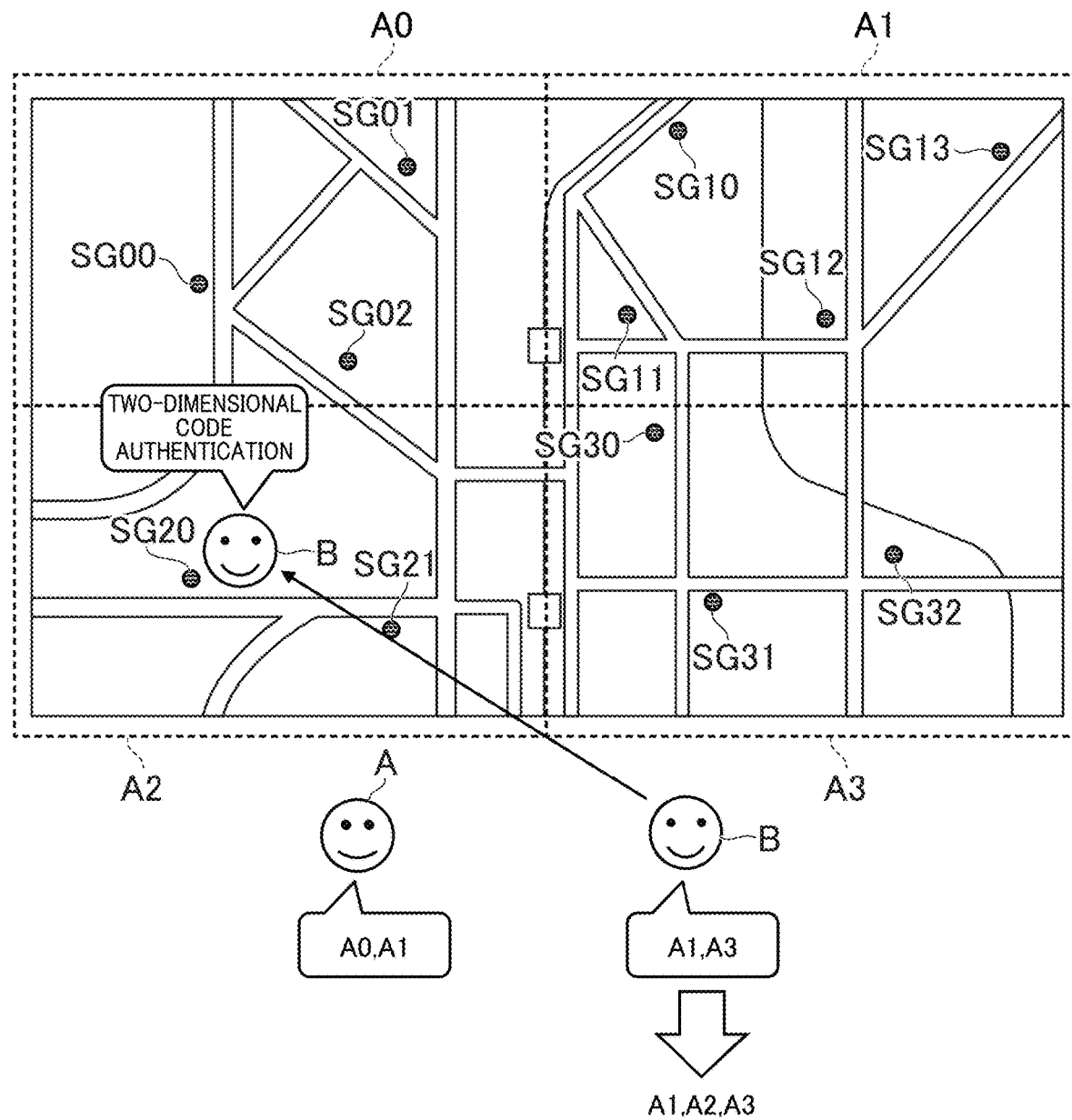
FIG. 7 is a diagram for illustrating an example of processing of the authentication system.

As illustrated in FIG. 7, when the user B tries to pass through the security gate SG20 of the area A2, because the user B is going to this location for the first time, the user B is required to successfully perform the two-dimensional code authentication. When the user B has successfully performed the two-dimensional code authentication, the user B and the area A2 are recorded in association with each other in the server 10. That is, the area A2 is added as an area in which the user B can use the two-step authentication. From the next time and the subsequent times, the user B can use the two-step authentication in the area A2. This also applies to the area A3. Similarly, for the user A as well, when the user A has successfully performed the two-dimensional code authentication in a new area A, from the next time and the subsequent times, the two-step authentication can be used in the area A.

Figure 8:
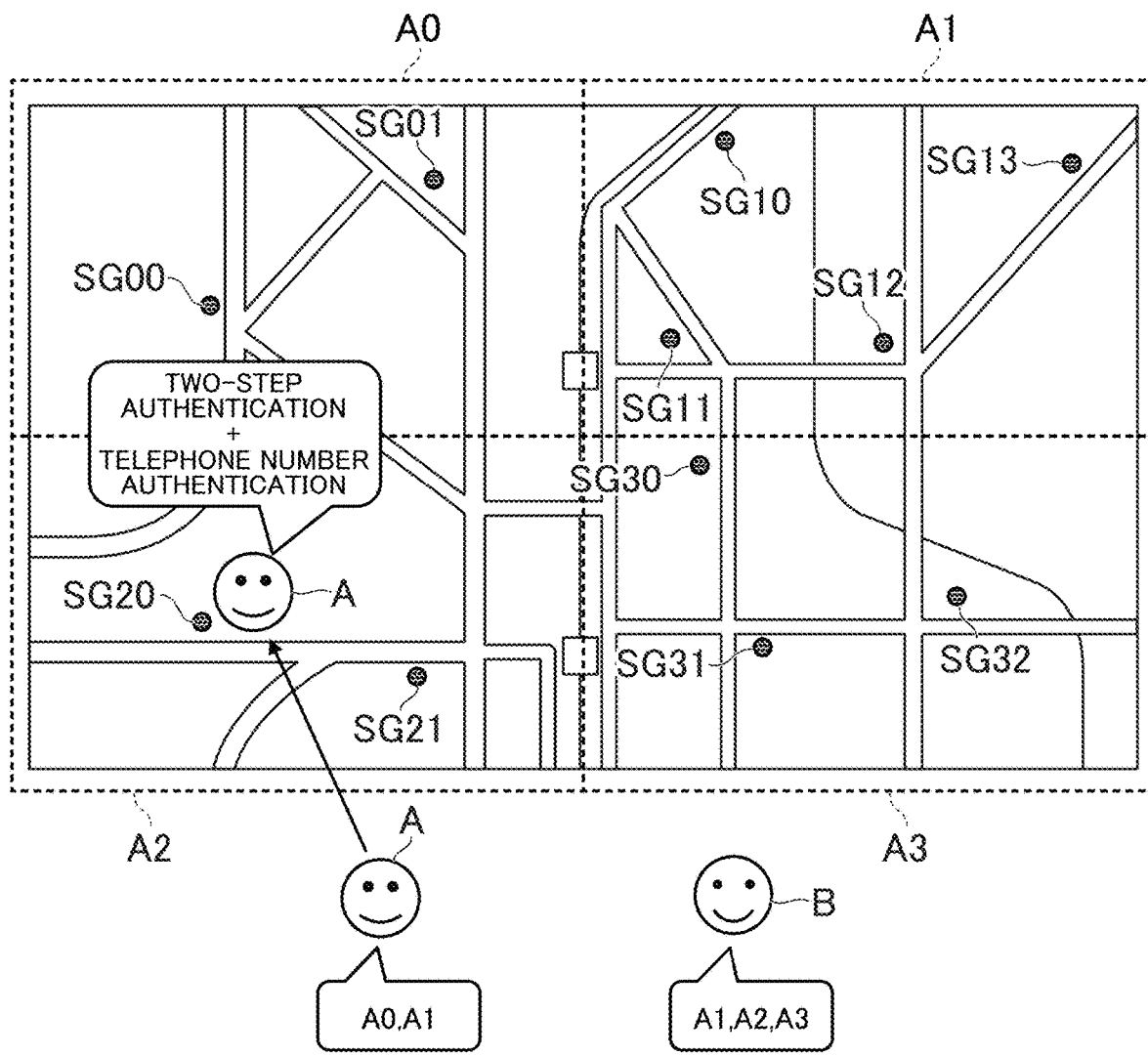
FIG. 8 is a diagram for illustrating an example of processing of the authentication system.

As illustrated in FIG. 8, it is assumed that the user A has selected two-step authentication at the security gate SG20 of the area A2. The user A has not completed the two-dimensional code authentication in the area A2, but has a similar face and the same passcode as those of the user B, who has completed the two-dimensional code authentication in the area A2 and can perform the two-step authentication. For this reason, when the two-step authentication is executed, the authentication system S cannot discriminate the user, and there is a possibility of impersonation. In a case like FIG. 8, telephone number authentication is performed as additional authentication in order to enhance security.

Figure 9:
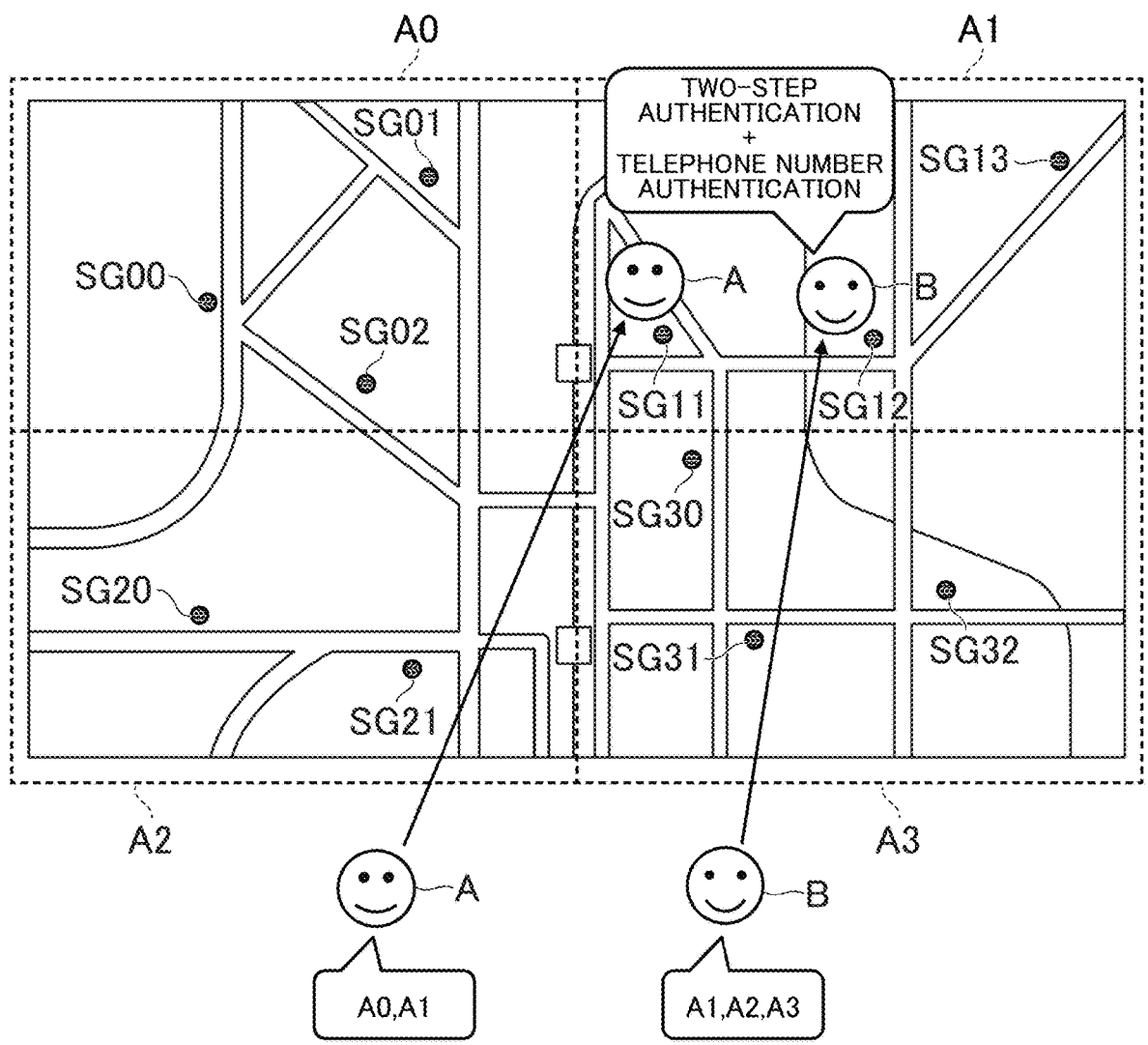
FIG. 9 is a diagram for illustrating an example of processing of the authentication system.

As illustrated in FIG. 9, it is assumed that the users A and B have each selected two-step authentication in the area A1. The users A and B have both completed the two-dimensional code authentication in the area A1, have similar faces to each other, and have the same passcode. Therefore, when executing the two-step authentication, the authentication system S cannot discriminate the users, and there is the possibility of impersonation. In a case like FIG. 9, telephone number authentication is performed as additional authentication in order to enhance security.

Figure 10:
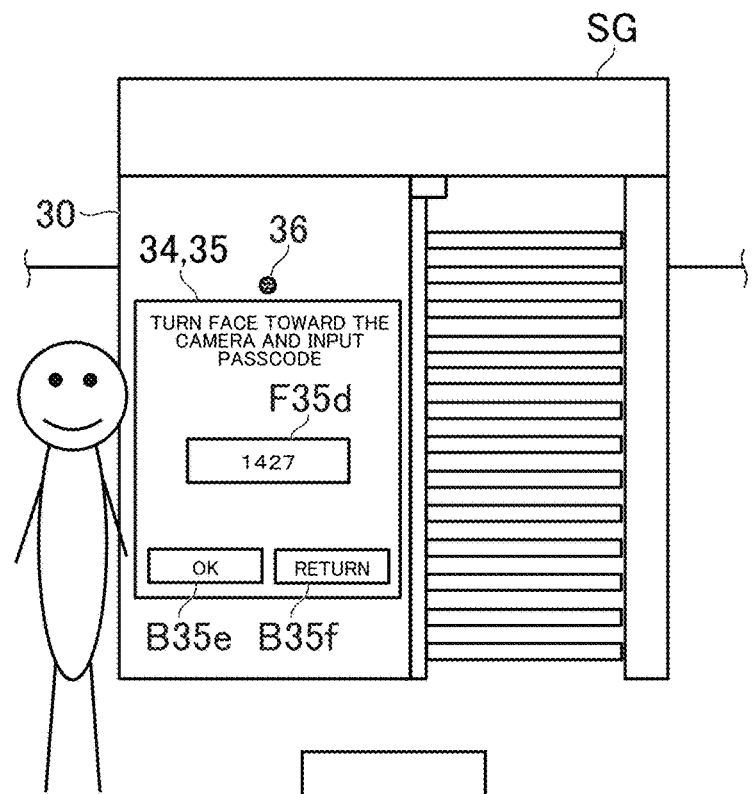
FIG. 10 is a diagram for illustrating how additional authentication is performed.
Figure 10:
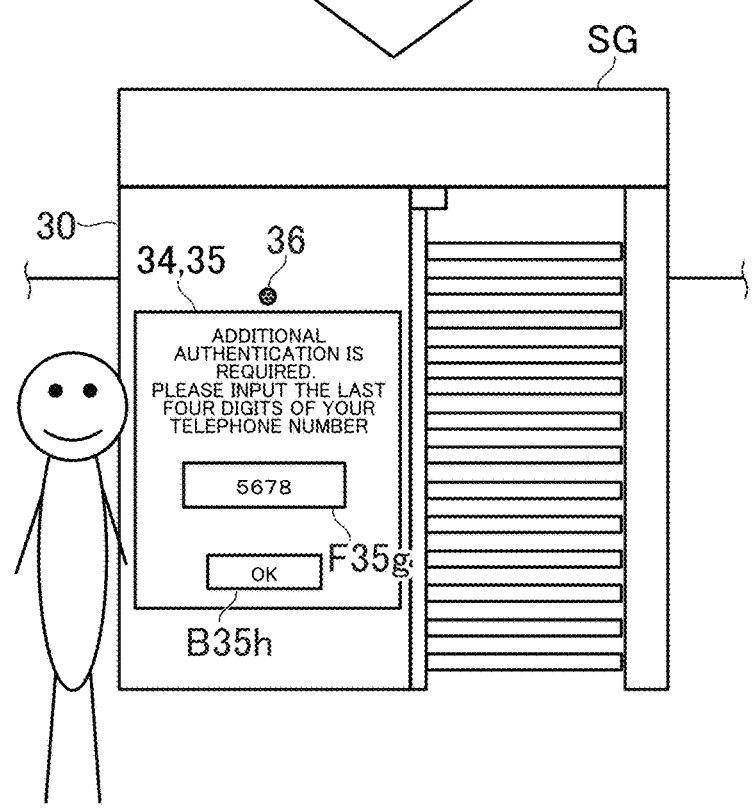

FIG. 10 is a diagram for illustrating how additional authentication is performed. As illustrated in FIG. 10, when a situation like that of FIG. 8 or FIG. 9 occurs, a message indicating that additional authentication is to be performed is displayed on the display unit 35 of the authentication device 30. The additional authentication is executed to identify the user trying to pass through the security gate SG. The security gate SG remains locked until the additional authentication is successful.

As illustrated in FIG. 10, the display unit 35 displays content to be input by the user in the additional authentication. In this embodiment, it is assumed that a part of a telephone number is required to be input in the additional authentication, but other information, for example, an email address, may be required to be input. The user A inputs the last four digits of his or her telephone number in an input form F35*g* in accordance with the additional authentication guidance displayed on the display unit 35. In this example, it is assumed that the last four digits of the telephone numbers of the users A and B are different.

When the user selects a button B35*h*, the last four digits of the telephone number input to the input form F35*g* are transmitted to the server 10, and additional authentication is executed. When the additional authentication is successful, the security gate SG is unlocked, and the user can pass through the security gate SG. The additional authentication is executed for the user B in the same manner.

As described above, the authentication system S of this embodiment sufficiently enhances security while preventing a reduction in convenience by recording, in the server 10, the location where the user successfully performed the two-dimensional code authentication so that, from the next time and the subsequent times, the two-step authentication can be performed at the same location. The details of this technology are now described.

3. Functions to be Implemented by Authentication System

Figure 11:
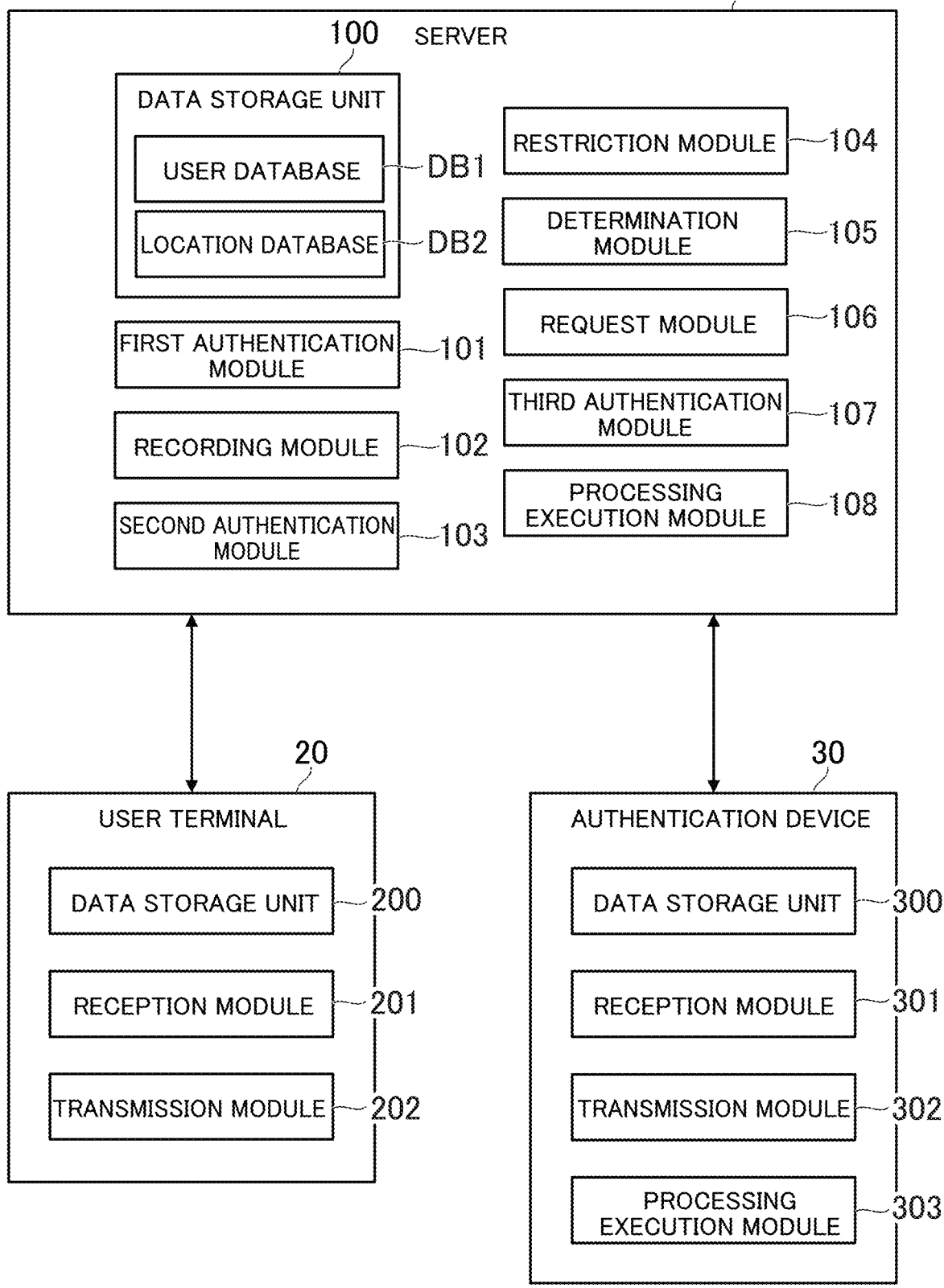
FIG. 11 is a functional block diagram for illustrating an example of functions to be implemented in the authentication system of this embodiment.

FIG. 11 is a functional block diagram for illustrating an example of functions to be implemented by the authentication system S of this embodiment. In this example, the functions to be implemented by each of the server 10, the user terminal 20, and the authentication device 30 are described.

[3-1. Functions to be Implemented by Server]

As illustrated in FIG. 11, in the server 10, a data storage unit 100, a first authentication module 101, a recording module 102, a second authentication module 103, a restriction module 104, a determination module 105, a request module 106, a third authentication module 107, and a processing execution module 108 are implemented.

[Data Storage Unit]

The data storage unit 100 is mainly implemented by the storage unit 12. The data storage unit 100 is configured to store the data required for authentication. As an example of the data stored in the data storage unit 100, a user database DB1 and a location database DB2 are described.

FIG. 12 is a table for showing a data storage example of the user database DB1. As shown in FIG. 12, the user database DB1 stores various pieces of information about the user. The user database DB1 stores a user ID, a user name, a password, data of an uploaded face photograph, a face feature amount calculated from the face photograph, a passcode, a registration date and time of the passcode, a telephone number, an email address, a token, and the like. Those pieces of information stored in the user database DB1 are examples of the user information.

For example, when the user performs use registration, a new record is created in the user database DB1. The new record stores the name, password, passcode, registration date and time of the passcode, telephone number, email address, face photograph, and feature amount calculated based on the face photograph in association with the user ID. When the user does not specify the user ID, the server 10 issues a new user ID.

When the token is issued to the user, the server 10 stores the token in association with the user ID of the user. The server 10 transmits the issued token to the user terminal 20. The user terminal 20 receives the token, and displays a two-dimensional code including the token on the display unit 25. The token in this embodiment is one-time information, and therefore the token becomes invalid when used in the two-dimensional code authentication. When the two-dimensional code authentication is executed again, a new token is issued. The token may be issued by any issuing method. For example, the token may be issued by an algorithm for generating a random character string. Further, in the case of setting an expiration date in the token, the expiration date may be stored in the user database DB1.

The password, the face feature amount, the passcode, and the token stored in the user database DB1 are a kind of authentication information. The telephone number and the email address can also be used in authentication, and therefore can be said to be a kind of authentication information.

The authentication information is information to be referred to during authentication. The name of the authentication information varies depending on the authentication method. For example, in the case of electronic stamp authentication, a multi-touch pattern of the stamp is the authentication information, and in the case of countersign authentication, the countersign is the authentication information. The authentication information may be used for any purpose. In this embodiment, the feature amount of the face, the passcode, the telephone number, and the token are used in order for the user to pass through the security gate. The face photograph may also correspond to the authentication information.

The feature amount of the face is information obtained by quantifying a feature of the face, and indicates features such as a color of the face or a relative position, size, or shape of a facial part. In this embodiment, the feature amount of the face indicated by the face photograph is calculated in advance, but the feature amount of the face may be calculated on the spot at the time of authentication. When a plurality of face photographs are to be registered, the feature amount of the face is calculated for each face photograph. Various methods are applicable for the actual face authentication. For example, a method such as principal component analysis, linear discriminant analysis, elastic matching, or hidden Markov model is usable, and the feature amount is only required to be calculated by a calculation expression corresponding to those methods. For example, the feature amount of the face is assumed to be represented by a multi-dimensional vector, but the feature amount of the face may be represented in another form, such as an array or a single numerical value.

As described above, the passcode is a number having a predetermined number of digits that is used for authentication. The passcode is sometimes referred to as "personal identification number (PIN)" or "code number." The passcode and the password are similar concepts, but differ in that the passcode is composed of only numbers, whereas the password may be composed of any kind of symbol. In this embodiment, the passcode has a fixed number of digits, whereas the password can be set to have any number of digits. It is not required that the number of digits of the passcode be determined.

The information stored in the user database DB1 is not limited to the example of FIG. 12, and any information on the user may be stored. For example, in the case of issuing valid authentication information to a legitimately authenticated user for a certain period of time, the authentication information may be stored in the user database DB1. Further, for example, any user information, for example, the user's date of birth, address, credit card number, or bank account number, may be stored in the user database DB1.

FIG. 13 is a table for showing a data storage example of the location database DB2. As shown in FIG. 13, the location database DB2 stores information on users who have successfully performed the two-dimensional code authentication at each of a plurality of locations. For example, the location database DB2 stores a location ID, an area name, and a user ID. The location ID is information for uniquely identifying the area. The area name can also be said to be information for uniquely identifying the area.

The user IDs stored in the location database DB2 are the user IDs of the users who have successfully performed the two-dimensional code authentication at the location indicated by the location ID. Storing the location ID and the user ID in the same record corresponds to the location ID and the user ID being associated with each other. In this embodiment, there is described a case in which the user ID and the location ID are associated in the location database DB2, but the user ID and the location ID may be stored in association with each other in the user database DB1 or another database.

[First Authentication Module]

The first authentication module 101 is mainly implemented by the control unit 11. The first authentication module 101 is configured to perform authentication based on a first authentication method. In this embodiment, the two-dimensional code authentication corresponds to the first authentication method. Therefore, the term "two-dimensional code authentication" in this embodiment can be read as "first authentication method." The first authentication method may be any authentication method, and is not limited to the two-dimensional code authentication. However, the first authentication method has a higher accuracy than that of the second authentication method described later. As used herein, "accuracy" refers to the reliability or security level of the authentication.

For example, the authentication of the first authentication method is authentication using the user terminal 20. Authentication using the user terminal 20 is authentication in which authentication information is output from the user terminal 20. The authentication information may be stored in the user terminal 20 in advance, or in place of storing in the user terminal 20 in advance, the authentication information may be issued on a one-time basis. Examples of the authentication using the user terminal 20 include authentication performed by displaying the authentication information itself on the user terminal 20, displaying code information including the authentication information on the user terminal 20, transmitting the authentication information from the user terminal 20, and aurally outputting the authentication information from the user terminal 20.

Further, for example, in the first authentication method, whether authentication is successful or has failed is determined based on a match between input authentication information and registered authentication information, and in the second authentication method, whether authentication is successful or has failed is determined based on a similarity between the input authentication information and the registered authentication information.

The input authentication information is the authentication information that has been input. The input authentication information is the authentication information input to the computer. In other words, the input authentication information can be said to be the information to be compared with the registered authentication information or the information to serve as a query during authentication. The input authentication information may be authentication information input through a user operation, or authentication information input based on a detection result of a sensor, for example, the photographing unit 36.

The registered authentication information is authentication information registered in advance. The registered authentication information is authentication information that may be a correct answer during authentication. In other words, the registered authentication information is information to be compared with the input authentication information, and is information serving as an index during authentication. The registered authentication information is registered when the use registration of the user is performed. The registered authentication information can be changed at a later time.

A "match" means that the input authentication information and the registered authentication information are the same. In this example, "match" means a complete match, and not a partial match. For this reason, in a case where it is determined that pieces of authentication information match, when the pieces of authentication information are even partially different from each other, authentication fails. For example, in authentication using tokens, a match between tokens is determined. Further, for example, in passcode authentication, a match between passcodes is determined. As another example, in password authentication, a match between passwords is determined.

A term "similar" refers to whether or not the input authentication information is similar to the registered authentication information. In other words, similarity is the difference or the discrepancy between the input authentication information and the registered authentication information. For example, in biometric authentication, the similarity between pieces of biological authentication information is determined. In biometric authentication, authentication information converted into a feature amount is used, and therefore when a difference (distance) between feature amounts is less than a threshold value, the authentication information is determined to be similar, and when the difference is equal to or more than the threshold value, the authentication information is determined not to be similar.

In the first authentication method, whether authentication is successful or has failed is determined based on a complete match between pieces of authentication information. In the second authentication method, even when there is a difference in pieces of authentication information, authentication is successful when that difference is less than a threshold value. Further, for example, in the first authentication method, whether authentication is successful or has failed may be determined based on a similarity between pieces of authentication information. However, in this case, the threshold value in the determination of success or failure is smaller than that in the second authentication method. That is, the first authentication method has a stricter condition (criterion) for determining whether authentication is successful or has failed than that of the second authentication method. For example, the first authentication method may be password authentication. Further, for example, the first authentication method may be fingerprint authentication having a stricter condition than that of face authentication. Moreover, for example, the first authentication method may be multi-step authentication. In this case, the first authentication method may have a larger number of authentication steps than those of the second authentication method.

For example, when the two-step authentication has failed, the first authentication module 101 may perform authentication of the user to be authenticated based on the two-dimensional code authentication.

The user to be authenticated is a user to be authenticated based on the input authentication information. In other words, the user to be authenticated is a user for which his or her validity (that is, who the user is) is to be confirmed by the authentication system S. For example, like in the case of two-dimensional code authentication or passcode authentication, when the user inputs the input authentication information by himself or herself, the user who has input the input authentication information corresponds to the user to be authenticated. Further, for example, like in the case of biometric authentication, when the input authentication information is input by detecting a user, the user to be detected corresponds to the user to be authenticated.

The first authentication module 101 may forcibly request that the user to be authenticated perform the two-dimensional code authentication when the authentication of the second authentication method has failed, or may perform the two-dimensional code authentication when the user selects the two-dimensional code authentication. In this embodiment, the first authentication module 101 performs the two-dimensional code authentication when the two-dimensional code authentication is selected.

[Recording Module]

The recording module 102 is mainly implemented by the control unit 11. The recording module 102 is configured to record, when the two-dimensional code authentication is successful, the authenticated user and the location of the user in association with each other in the data storage unit 100. The recording module 102 associates the authenticated user with the location of the user on condition that the two-dimensional code authentication is successful.

As used herein, "associating the user with the location" means recording information for identifying the user and information for identifying the location in a manner in which those pieces of information can be searched. In this embodiment, storing the user ID and the location ID in the location database DB2 corresponds to associating the user with the location. The user may be identified by using other information, for example, the user name. The location may be identified by using other information, for example, the area name.

For example, there may be a case in which the two-dimensional code authentication is executed after the two-step authentication of a certain user to be authenticated has failed. Therefore, when the two-dimensional code authentication is successful, the recording module 102 records the authenticated user to be authenticated and the location of the user to be authenticated in association with each other in the data storage unit 100. For example, when the user to be authenticated selects the two-dimensional code authentication after the two-step authentication has failed, the two-dimensional code authentication is executed. In this case, the recording module 102 associates, on condition that the two-dimensional code authentication is successful, the user ID of the user to be authenticated with the location ID of the location.

In this embodiment, the area corresponds to the location. Therefore, the recording module 102 records, in the data storage unit 100, the area in which the user is present as the location of the user authenticated by the two-dimensional code authentication. The location is not required to be a region having a certain size, for example, an area, and may be represented in a pinpoint manner by using longitude and latitude or coordinates. Further, the authentication is performed by using the authentication device 30, and therefore the recording module 102 records the user authenticated by the two-dimensional code authentication and the location of the authentication device 30 used in the authentication of the user in association with each other in the data storage unit 100.

[Second Authentication Module]

The second authentication module 103 is mainly implemented by the control unit 11. The second authentication module 103 is configured to perform authentication based on a second authentication method. In this embodiment, the two-step authentication corresponds to the second authentication method. Therefore, the term "two-step authentication" in this embodiment can be read as "second authentication method." The second authentication method may be any authentication method, and is not limited to the two-step authentication. However, the second authentication method has a lower accuracy than that of the first authentication method. However, the second authentication method is more convenient than the first authentication method.

As used herein, "convenience" refers to the usability (ease of use) for the user to be authenticated. For example, not being required to use the user terminal 20 at the time of authentication corresponds to a high convenience. As another example, a small input amount at the time of authentication by the user to be authenticated corresponds to a high convenience. For example, the second authentication method may be face authentication only or passcode authentication only. Further, for example, the second authentication method may be biometric authentication other than face authentication, or electronic stamp authentication.

For example, in the two-step authentication, the input authentication information and the registered authentication information are compared. The second authentication module 103 performs authentication based on the input authentication information on the user to be authenticated and the registered authentication information acquired as a target of comparison. The registered authentication information not acquired as the target of comparison is not used in the two-step authentication. Therefore, in the two-step authentication, it is not possible for a user to be authenticated as the user of the registered authentication information not acquired as the target of comparison.

In this embodiment, the user can select the authentication method. Therefore, the second authentication module 103 performs the two-step authentication when the two-step authentication is selected. The second authentication module 103 performs the two-step authentication on condition that the two-step authentication has been selected. For example, the two-step authentication includes an authentication method based on a similarity between pieces of authentication information and an authentication method based on a match between pieces of authentication information. The two-step authentication is not limited to those examples, and any combination can be applied.

[Restriction Module]

The restriction module 104 is mainly implemented by the control unit 11. The restriction module 104 is configured to restrict successful two-step authentication when the user to be authenticated in the two-step authentication and the location of the user to be authenticated are not associated with each other in the data storage unit 100. The restriction module 104 does not restrict successful two-step authentication when the user to be authenticated and the location of the user to be authenticated are associated with each other.

The term "restrict" refers to prohibiting successful two-step authentication. For example, even when the condition for successful authentication (a match or a similarity between pieces of authentication information) is satisfied, forcibly failing the authentication corresponds to "restrict." Further, for example, using only the registered authentication information on users associated with the location of the user to be authenticated as the registered authentication information to be compared with the input authentication information corresponds to "restrict." As another example, not executing the authentication processing in the first place corresponds to "restrict."

For example, the restriction module 104 acquires the registered authentication information on the users associated with the location of the user to be authenticated as the target of comparison with the input authentication information on the user to be authenticated. The target of comparison is an index to be used at the time of authentication. The restriction module 104 restricts successful two-step authentication by not comparing with the registered authentication information on users not associated with the location of the user to be authenticated. That is, the restriction module 104 excludes, from the registered authentication information to be used as a target of comparison, the registered authentication information on users not associated with the location of the user to be authenticated.

In this embodiment, the area corresponds to the location. Therefore, the restriction module 104 restricts successful two-step authentication when the user to be authenticated and the area in which the user to be authenticated is present are not associated with each other in the data storage unit 100. Further, the restriction module 104 restricts successful two-step authentication when the user to be authenticated and the location of the authentication device 30 used in the authentication of the user to be authenticated are not associated with each other.

[Determination Module]

The determination module 105 is mainly implemented by the control unit 11. The determination unit 105 is configured to determine, when the user to be authenticated and the location of the user to be authenticated are associated with each other, whether or not there is a possibility that the user to be authenticated is authenticated as another user based on the two-step authentication. The term "another user" means a user other than the user to be authenticated. The expression "possibility that the user to be authenticated is authenticated as another user" means the possibility that the user to be authenticated is falsely rejected as a user who is not the user to be authenticated. This possibility is hereinafter referred to as "possibility of false rejection."

For example, in an authentication method involving the determination based on the similarity between the input authentication information and the registered authentication information, the determination module 105 determines that there is the possibility of false rejection when a plurality of pieces of the registered authentication information are similar to the input authentication information. For example, a state in which the user to be authenticated is authenticated as each of a plurality of users including the user to be authenticated and another user corresponds to the state in which there is the possibility of false rejection.

Further, for example, the determination module 105 may acquire the similarity degree between the input authentication information and each of the plurality of pieces of registered authentication information, and determine whether or not there is the possibility of false rejection based on a difference between those acquired similarity degrees. In face authentication in this embodiment, the distance between the feature amounts in a vector space corresponds to the similarity degree, and therefore the determination module 105 determines whether or not there is the possibility of false rejection based on the difference between the distance of each piece of registered authentication information. When the difference is equal to or more than a threshold value, there is no possibility of false rejection, and when the difference is less than the threshold value, there is the possibility of false rejection.

Further, for example, the determination module 105 may acquire the similarity degree of the registered authentication information determined to be similar to the input authentication information and the similarity degree of the registered authentication information determined not to be similar to the input authentication information, and determine whether or not there is the possibility of false rejection based on a difference between those acquired similarity degrees. When the difference is equal to or more than a threshold value, there is no possibility of false rejection, and when the difference is less than the threshold value, there is the possibility of false rejection. That is, the state in which the user to be authenticated is authenticated as another user without being authenticated as the user to be authenticated corresponds to the state in which there is the possibility of false rejection.

In this embodiment, two-step authentication is executed. Therefore, the determination module 105 determines whether or not there is the possibility that the user to be authenticated is authenticated as another user in both the face authentication and the passcode authentication. The method of determining the possibility of false rejection in the face authentication is as described above. The passcode authentication performs determination based on a match between pieces of authentication information. Therefore, for example, when there are a plurality of pieces of the registered authentication information matching the input authentication information, there is the possibility of false rejection. The determination module 105 determines that there is the possibility of false rejection when there is the possibility of false rejection in the face authentication and there is the possibility of false rejection in the passcode authentication.

[Request Module]

The request module 106 is mainly implemented by the control unit 11. The request module is configured to request, when it is determined that there is the possibility of false rejection, the user to be authenticated to perform authentication based on the two-dimensional code authentication or a third authentication method. The third authentication method is an authentication method that is not the first authentication method and is not the second authentication method. The third authentication method may have a higher accuracy or a lower accuracy than that of the first authentication method. Moreover, the third authentication method may have a higher or a lower accuracy than that of the first authentication method.

In this embodiment, telephone number authentication corresponds to the third authentication method. Therefore, the term "telephone number authentication" in this embodiment can be read as "third authentication method." The third authentication method may be any authentication method and is not limited to telephone number authentication. For example, the third authentication method may be password authentication, countersign authentication, email address authentication, or biometric authentication other than face authentication. When personal information registered by the user in the third authentication method is used, the input of all of the personal information may be required, or the input of only a portion different between the users for which there is the possibility of false rejection may be required.

[Third Authentication Module]

The third authentication module 107 is mainly implemented by the control unit 11. The third authentication module 107 is configured to perform authentication of the user to be authenticated based on the telephone number authentication when the two-step authentication has failed. In the case of the telephone number authentication, whether the authentication is successful or has failed is determined based on a match between pieces of authentication information. Therefore, the third authentication module 107 performs the authentication by determining whether or not the input authentication information and the registered authentication information match. In this embodiment, the authenticated user to be authenticated and the location of the user to be authenticated are not associated with each other in the data storage unit 100 even when the telephone number authentication is successful. The authenticated user to be authenticated and the location of the user to be authenticated are associated only when the two-dimensional code authentication is successful.

[Processing Execution Module]

The processing execution module is mainly implemented by the control unit 11. The processing execution module 108 is configured to execute predetermined processing when the two-dimensional code authentication or the two-step authentication is successful. The predetermined processing is processing permitted to be executed when authentication is successful. In this embodiment, there is described a case in which processing for unlocking the security gate SG corresponds to the predetermined processing, but any processing is applicable as the predetermined processing. Examples of the predetermined processing include login processing to a server or a terminal, processing of unlocking a computer, processing of permitting data browsing, processing of permitting data writing, processing of opening and closing an automatic door, processing of permitting electronic voting, and processing of permitting acquisition of a public document.

The processing execution module 108 itself may control the unlocking, but in this embodiment, a processing execution module 303 of the authentication device 30 executes the unlocking control, and therefore the processing execution module 108 notifies an authentication result to the authentication device 30. For example, when the authentication fails, the processing execution module 108 does not transmit a notification indicating that authentication has been successful, and when the authentication is successful, transmits a notification indicating that authentication has been successful. When the authentication by the user has not been successful a certain number of times, the authentication information on the record storing the passcode input by the user or the record storing the feature amount similar to the face of the user may be locked and prevented from being used.

[3-2. Functions to be Implemented by User Terminal]

As illustrated in FIG. 11, in the user terminal 20, a data storage unit 200, a reception module 201, and a transmission module 202 are implemented. In this embodiment, there is described a case in which the user terminal 20 is included in the authentication system S, but the user terminal 20 may be an external device that can communicate to and from the authentication system S.

[Data Storage Unit]

The data storage unit 200 is mainly implemented by the storage unit 22. The data storage unit 200 is configured to store the data required for the registration application. For example, the data storage unit 200 stores data of the face photograph of the user. The data storage unit 200 may also store a user ID and a password. Further, for example, the data storage unit 200 may store a two-dimensional code generation program or an application of the authentication service.

[Reception Module]

The reception module 201 is mainly implemented by the control unit 21. The reception module 201 is configured to receive input operations for the user to perform a registration application. For example, the reception module 201 receives input of the user ID, the password, the file name of the face photograph, the passcode, the telephone number, and the email address. The input operations received by the reception module unit 201 are not limited to those input operations, and various other input operations can be received. For example, the reception module 201 may receive an operation of causing a two-dimensional code to be displayed.

[Transmission Module]

The transmission module 202 is mainly implemented by the control unit 21. The transmission module 202 is configured to transmit data for performing the registration application, based on an input operation received by the reception module 201. For example, the transmission module 202 transmits the user ID, the password, the face photograph data, the passcode, the telephone number, and the email address to the server 10 based on the input operations by the user. The data transmitted by the transmission module 202 is not limited to those pieces of data, and various other data can be transmitted.

[3-3. Functions to be Implemented by Authentication Device]

As illustrated in FIG. 11, in the authentication device 30, a data storage unit 300, a reception module 301, a transmission module 302, and the processing execution module 303 are implemented. In this embodiment, there is described a case in which the authentication device 30 is included in the authentication system S, but the authentication device 30 may be an external device that can communicate to and from the authentication system S. Further, in this embodiment, it is assumed that there are a plurality of authentication devices 30 each corresponding to one of the first authentication method and the second authentication method.

[Data Storage Unit]

The data storage unit 300 is mainly implemented by the storage unit 32. The data storage unit 300 is configured to store the data required for authentication. For example, the data storage unit 300 stores information on the IP address of the server 10 and the like. As another example, the data storage unit 300 stores data (e.g., HTML data or image data) for displaying the input form, the button, and the like on the display unit 35.

[Reception Module]

The reception module 301 is mainly implemented by the control unit 31. The reception module 301 is configured to receive input operations. The input operation may be any input operation required for authentication. In this embodiment, the reception module 301 receives a selection of any one of the two-dimensional code authentication and the two-step authentication. The reception unit 301 also receives an input operation of information required for authentication. In face authentication, no user input operation is required, and therefore the reception unit 301 receives an operation of inputting the passcode.

It is sufficient for the reception module 301 to receive an input operation corresponding to the type of authentication to be used by the authentication system S. For example, when fingerprint authentication is to be used, an input operation of the user placing a finger on a camera, a sensor, or the like is received. As another example, when handwriting authentication is to be used, an input operation of the user writing characters on a touch panel or the like is received. As another example, when password authentication or countersign authentication is to be used, the reception module 301 receives an operation of inputting a password or a countersign. A microphone may be arranged in the authentication device 30, and the countersign may be detected by the microphone.

[Transmission Module]

The transmission module 302 is mainly implemented by the control unit 31. The transmission module 302 is configured to transmit information required for authentication, based on the input operation. The transmission module 302 may transmit the authentication information itself or may transmit information for identifying the authentication information.

In this embodiment, there is described a case in which the first authentication module 101 and the second authentication module 103 are implemented by the server 10, and therefore there is described a case in which the transmission module 302 transmits the data to the server 10. However, when the first authentication module 101 and the second authentication module 103 are implemented by another computer, the data may be transmitted to the another computer. For example, when the first authentication module 101 and the second authentication module 103 are to be implemented by different computers, the transmission module 302 is only required to transmit the information to those computers.

In this embodiment, the first authentication method is the two-dimensional code authentication. Therefore, the transmission module 302 is configured to transmit the authentication information included in the two-dimensional code. In a case where analysis of the two-dimensional code is to be executed on the server 10 side, the transmission module 302 transmits a photographed image of the two-dimensional code. Further, the second authentication method is the two-step authentication. Therefore, the transmission module 302 transmits the photographed image (face photograph) photographed by the photographing unit 36 and the input passcode. The feature amount of the face may be calculated on the authentication device 30 side. In this case, in place of an image, the transmission module 302 transmits the calculated feature amount of the face. Moreover, the third authentication method is the telephone number authentication. Therefore, the transmission module 302 transmits the input telephone number.

It is sufficient for the transmission module 302 to transmit information corresponding to the type of authentication to be used by the authentication system S. For example, when fingerprint authentication is to be used, the transmission module 302 may transmit an image of the finger of the user, or a feature amount of the finger calculated from the image may be transmitted. As another example, when handwriting authentication is to be used, the transmission module 302 may transmit an image of characters written on a touch panel or the like by the user, or may transmit coordinate information indicating a change in touch position. As another example, when password authentication or countersign authentication is to be used, the transmission module 302 transmits a password or countersign input by the user.

[Processing Execution Module]

The processing execution module 303 is mainly implemented by the control unit 31. The processing execution module 303 is configured to execute predetermined processing when the two-dimensional code authentication or the two-step authentication is successful. In a case where the telephone number authentication is to be performed as additional authentication, the processing execution module 303 executes predetermined process when the telephone number authentication is successful. The meaning of the predetermined processing is as described above, and is processing permitted to be executed when authentication is successful.

In this embodiment, when the authentication is successful, the security gate SG is unlocked. Therefore, when a notification indicating that authentication is successful is received, the processing execution module 303 unlocks the lock by causing a motor or the like of the lock mechanism to rotate, and when a notification indicating that the authentication is successful is not received, the processing execution module 303 does not unlock the lock. The processing execution module 108 of the server 10 may transmit a signal for unlocking the lock mechanism in place of a notification indicating that the authentication is successful. In this case, the processing execution module 303 of the authentication device 30 is only required to unlock the lock based on the signal.

4. Processing to be Executed in this Embodiment

FIG. 14 and FIG. 15 are flowcharts for illustrating an example of processing to be executed in this embodiment.

The processing illustrated in FIG. 14 and FIG. 15 is executed by the control units 11 and 31 operating in accordance with programs stored in the storage units 12 and 32, respectively. The processing described below is an example of processing to be executed by the functional blocks illustrated in FIG. 11. When authentication processing is to be executed, it is assumed that use registration is complete.

As illustrated in FIG. 14, first, the authentication device 30 displays, on the display unit 35, the buttons B35a and B35b for selecting the authentication method (Step S1), and identifies the selected authentication method based on a detection signal of the operation unit 34 (Step S2). In Step S2, it is determined that the two-dimensional code authentication is selected when the button B35a is selected, and it is determined that the two-step authentication is selected when the button B35b is selected.

When the two-dimensional code authentication is selected (Step S2: Two-Dimensional Code Authentication), the authentication device 30 displays guidance for the two-dimensional code authentication on the display unit 35 (Step S3). The screen display of the display unit 35 in Step S3 is the state illustrated in the upper part of FIG. 3. The user operates the user terminal 20 in accordance with the guidance for the two-dimensional code authentication to display the two-dimensional code. For example, the user terminal 20 transmits a token issuance request to the server 10. The server 10 receives the issuance request, issues a token, and transmits the issued token to the user terminal 20. The user terminal 20 displays a two-dimensional code including the received token. When the token is issued, input of a user ID and a password may be required. Further, when the button B35c displayed on the display unit 35 is selected, the processing returns to Step S1.

The authentication device 30 detects the two-dimensional code based on a detection signal of the photographing unit 36 (Step S4), and acquires the token included in the two-dimensional code (Step S5). The user holds the two-dimensional code displayed on the user terminal 20 up to the photographing unit 36, and the photographing unit 36 reads the two-dimensional code. The method of reading the two-dimensional code itself is only required to be executed based on a procedure in accordance with a standard of the two-dimensional code.

The authentication device 30 transmits the location ID and the token to the server 10 (Step S6). It is assumed that the location ID is stored in the storage unit 32 of the authentication device 30. The authentication device 30 transmits those pieces of information to request the server 10 to execute the two-dimensional code authentication.

The server 10 receives the location ID and the token, and performs the two-dimensional code authentication based on the user database DB1 (Step S7). In Step S7, the server 10 refers to the user database DB1, and determines whether or not there is a user having a user ID associated with the received token. When there is a user having a user ID associated with the received token, the authentication is successful, and when there is not such a user, the authentication fails.

When the two-dimensional code authentication has failed (Step S7: Failed), the server 10 transmits a predetermined error message to the authentication device 30 (Step S8), and the processing ends. In this case, the error message is displayed on the display unit 35 of the authentication device 30 to notify the user that the authentication has failed. After that, the processing of Step S1 may be executed again, and the selection of another authentication method may be received.

Meanwhile, when the two-dimensional code authentication is successful (Step S7: Successful), the server 10 records the location ID and the user ID received in Step S7 in association with each other in the location database DB2 (Step S9). In Step S9, the server 10 stores, in the location database DB2, the user ID received in Step S7 in the record in which the location ID received in Step S7 is stored. When the user ID received in Step S7 is already stored in the record, the user ID is not stored in duplicate.

The server 10 transmits, to the authentication device 30, an "authentication successful" notification indicating that authentication has been successful (Step S10). The authentication successful notification is performed by transmitting data having a predetermined format, and includes the name of the user for which authentication has been successful.

When the authentication device 30 receives the notification, the authentication device 30 unlocks the security gate SG (Step S11), displays the name of the user for which authentication has been successful on the display unit 35 (Step S12), and the processing ends. The user confirms that his or her name is displayed on the display unit 35, and pushes the door of the security gate to pass through the security gate. In this case, information such as the name of the user and the current date and time may remain in the server 10 as a traffic record.

Meanwhile, when the two-step authentication is selected in Step S2 (Step S2: Two-Step Authentication), the processing advances to FIG. 15, and the authentication device 30 displays guidance for the two-step authentication on the display unit 35 (Step S13). The screen display of the display unit 35 in Step S13 is the state illustrated in the upper part of FIG. 4. The user turns his or her face toward the photographing unit 36 to take a photograph of his or her face in accordance with the guidance of the two-step authentication, and inputs the passcode. When the button B35*f* displayed on the display unit 35 is selected, the processing returns to Step S1.

The authentication device 30 acquires a photographed image based on a detection signal of the photographing unit 36 (Step S14), and receives input of the passcode by the user based on a detection signal of the operation unit 34 (Step S15). In Step S15, the authentication device 30 receives input of the four-digit passcode to the input form F35*d*. For example, a software numeric keypad for inputting the passcode is displayed on the display unit 35. In this embodiment, the passcode has four digits, but the passcode may have any number of digits. For example, the passcode may have less than four digits, or five or more digits.

The authentication device 30 transmits, in response to the user selecting the button B35*e*, the location ID, the photographed image acquired in Step S14, and the passcode input in Step S15 to the server 10 (Step S16). The authentication device 30 requests the server 10 to execute the two-step authentication by transmitting those pieces of information.

When the server 10 receives the location ID, the photographed image, and the passcode, the control unit 11 refers to the location database DB2 and identifies the user IDs associated with the received location ID (Step S17). The server refers to the user database DB1 and acquires the feature amount of the face and the passcode associated with each user ID identified in Step S17 (Step S18). The feature amounts and the passcodes acquired in Step S18 are the targets of comparison in the two-step authentication. Feature amounts and passcodes not acquired in Step S18 are not used as targets of comparison. Through the processing of Step S18, it is possible to prevent authentication as a user having a user ID not associated with the location ID received in Step S17.

The server 10 performs the two-step authentication based on the photographed image and the passcode received in Step S17 and the feature amounts of the face and the passcodes acquired in Step S18 (Step S19). In Step S19, the server 10 determines whether or not, among the combinations of feature amounts and passcodes acquired in Step S18, there is a combination in which the feature amount of the photographed image received in Step S17 is similar and there is a match with the passcode received in Step S17. When there is even one such combination, the authentication is successful, and when there is no such combination, the authentication fails.

When the two-step authentication fails (Step S19: Failed), the processing returns to Step S8 and an error message is transmitted. Meanwhile, when the two-step authentication is successful (Step S19: Successful), the server 10 determines whether or not there is the possibility of false rejection (Step S20). In Step S20, the server 10 determines whether or not there are a plurality of combinations determined in Step S19. When it is not determined that there is the possibility of false rejection (Step S20: N), the processing returns to Step S10, and the security gate SG is unlocked.

Meanwhile, when it is determined that there is the possibility of false rejection (Step S20: Y), the server 10 generates additional authentication information based on the user database DB1, and requests the authentication device 30 for input of the additional authentication information (Step S21). The request for input of the additional authentication information includes information for identifying what item of the user information has been generated as the additional authentication information. In this embodiment, the additional authentication is telephone number authentication, and therefore the server 10 acquires the telephone number of the user for which the two-step authentication has been successful, and generates the additional authentication information. The additional authentication information is authentication information serving as the correct answer in the additional authentication, and therefore the additional authentication information corresponds to registered authentication information.

The authentication device 30 receives the request, and displays on the display unit 35 a screen for receiving input of the additional authentication information (Step S22). The screen display of the display unit 35 in Step S22 is the state illustrated in the lower part of FIG. 10.

The authentication device 30 receives input of the additional authentication information by the user based on a detection signal of the operation unit 34 (Step S23). In Step S23, the authentication device 30 receives input of the additional authentication information to the input form F35*g*. For example, a software numeric keypad for inputting the telephone number is displayed on the display unit 35. The authentication device 30 transmits, in response to the user selecting the button B35*h*, the additional authentication information input in Step S23 to the server 10 (Step S24). The authentication device 30 requests the server 10 to execute the additional authentication by transmitting the additional authentication information.

When the server 10 receives the additional authentication information, the server 10 performs additional authentication (Step S25). In Step S25, the server 10 determines whether or not the input additional authentication information matches the additional authentication information generated in Step S. When there are users for which those pieces of additional authentication match, the authentication is successful. When there are no users for which those pieces of additional authentication do not match, the authentication fails. When the additional authentication is successful (Step S25: Successful), the processing returns to Step S10. In this case, the processing of Step S9 is not executed. When the additional authentication fails (Step S25: Failed), the processing returns to Step S8.

According to the authentication system S of this embodiment, impersonation can be prevented and security can be enhanced by restricting successful two-step authentication when the user to be authenticated in the two-step authentication and the location of the user to be authenticated are not associated with each other in the location database DB2. For example, when a part of the passcode is generated on the authentication system S side, it is more difficult to remember the passcode and convenience is reduced. However, according to the authentication system S, the length of the passcode does not change even when two-step authentication is employed, and therefore it is possible to prevent such a reduction in convenience. Moreover, for example, in a case where additional authentication information such as an email address or a telephone number is input, the input becomes complicated and convenience is reduced. However, according to the authentication system S, it is not required to input additional authentication information as long as a user who successfully has performed the two-dimensional code authentication is not present in the same area, and therefore such a reduction in convenience can be prevented.

The authentication system S can reduce the registered authentication information to be used as a target of comparison during two-step authentication by restricting successful two-step authentication by not using as the target of comparison the registered authentication information on users not associated with the location of the user to be authenticated. As a result, the authentication can be speeded up and the processing load on the server 10 can be reduced.

The authentication system S can enhance security by performing, when the two-step authentication has failed, authentication of the user to be authenticated based on the two-dimensional code authentication, and recording the authenticated user to be authenticated and the location of the user to be authenticated in association with each other when the two-dimensional code authentication is successful.

The authentication system S can enhance security by requesting the user to be authenticated to perform two-dimensional code authentication or telephone number authentication when it is determined in the two-step authentication that there is the possibility that the user to be authenticated is authenticated as another user.

The authentication system S can improve the convenience of a user by recording, in the location database DB2, as the location of a user authenticated by two-dimensional code authentication, the area in which the certain user is present and performing a two-dimensional code at the security gates SG in the certain area, to thereby enable two-step authentication to be performed at the other security gates SG in the area.

The authentication system S can effectively enhance security by performing authentication of the user to be authenticated based on telephone number authentication when the two-step authentication has failed. Further, in order to permit the two-step authentication, even more accurate two-dimensional code authentication can be requested and security can be effectively enhanced by not associating an authenticated user to be authenticated and the location of the user to be authenticated even when the telephone number authentication is successful (that is, by not permitting the two-step authentication even when the telephone number authentication is successful).

The authentication system S can prompt the user to select his or her preferred authentication method and enhance convenience by receiving a selection of any one of the two-dimensional code authentication and the two-step authentication.

The authentication system S can effectively enhance security by performing two-step authentication including an authentication method based on a similarity between pieces of authentication information and an authentication method based on a match between pieces of the authentication information.

The authentication system S can enhance security in the authentication using the authentication device 30 by using a plurality of authentication devices 30 each corresponding to one of the two-dimensional code authentication and the two-step authentication to perform authentication.

The authentication system S can effectively enhance security by performing authentication using the user terminal 20 and biometric authentication.

5. Modification Examples

The modes of the present invention are not limited to the embodiment described above, and can be modified suitably without departing from the spirit of the modes of the present invention.

For example, in the embodiment, a situation in which the user passes through the security gate SG is described as an example, but the authentication system S is also applicable to a situation in which the user purchases a product or uses a service. In this case, for example, the authentication device 30 is a vending machine, a ticket machine, a POS terminal, or a payment terminal in a store. The user faces the photographing unit 36 of the authentication device 30 and inputs the passcode from the operation unit 34. When face authentication and passcode authentication are successful, payment processing is executed, and the product can be purchased or the service can be used.

When two-dimensional code authentication or two-step authentication is successful, the processing execution module 108 executes payment processing based on the payment information on the authenticated user. The payment information to be referred to at the time of payment processing is payment information associated with the user for which the authentication is successful.

The payment information is information required in order to perform payment, such as credit card information, electronic value (e.g., electronic money or points) account information, virtual currency account information, bank account information, or debit card information. It is assumed that the payment information is registered during user registration, and is stored in the user database DB1 in association with the user ID, for example. The payment information may be stored in a database different from the user database DB1.

It is sufficient for the processing execution module 108 to execute payment processing corresponding to the payment information. For example, the processing execution module 108 executes credit processing based on credit card information, processing of decreasing an electronic value balance, processing of decreasing a virtual currency balance, processing of debiting and transferring from a bank account, or processing of decreasing the balance of the account indicated by debit card information. The processing execution module 108 does not execute payment processing when authentication fails, and executes payment processing when authentication is successful.

When payment processing has been executed, that fact is displayed on the display unit 35 of the authentication device 30 or a terminal of the shop, and the user receives the product or uses the service. For example, in a case where the authentication device 30 is a digital signage device installed in a shop or the like, when an authentication successful notification is received from the server 10, a message indicating that the authentication has been successful is displayed on the display unit 35. When a shop staff member confirms the message, the staff member hands over the product or provides the service to the user. In place of the authentication device 30, the message may be transferred to another computer, such as a terminal operated by the shop staff member, to be displayed. As another example, in a case where the authentication device 30 is a vending machine, when an authentication successful notification is received from the server 10, the authentication device 30 discharges the product specified by the user or prepares a product such as coffee or instant food.

According to the modification examples described above, security at the time of purchasing a product or using a service can be sufficiently enhanced by preventing another user having a similar face from improperly purchasing a product or using a service by impersonating the user and paying. Further, from the viewpoint of the user, usability can be improved because it is possible to perform payment in a secure manner even when the user goes to the shop without carrying any money or the like, and from the viewpoint of the shop, shop's convenience can be improved because payment is possible without requiring a dedicated device, for example, a credit card reader, to be installed.

For example, there has been described a case in which biometric authentication is executed based on an image photographed by the photographing unit 36 of the authentication device 30. However, the biometric authentication may also be executed by using another sensor, such as an infrared sensor or an ultrasonic sensor. The authentication system S is only required to include a sensor corresponding to the biometric authentication to be used. Further, for example, there has been described a case in which additional authentication is performed when there is the possibility of false rejection in the two-step authentication, but the additional authentication may not be performed. The two-dimensional code authentication may be required in place of the additional authentication.

For example, there has been described a case in which the authentication information is input to the authentication device 30, but the authentication information may be input to the user terminal 20 or another computer. For example, when the user operates the user terminal 20 and the two-dimensional code authentication is successful, the user and the location of the user terminal 20 may be stored in association with each other in the user database DB1. In this case, the location of the user terminal 20 may be acquired by using any positioning method such as GPS information or wireless base station information.

For example, there has been described a case in which the main functions are implemented by the server 10, but each function may be shared by a plurality of computers. For example, functions may be shared among the server 10, the user terminal 20, and the authentication device 30. For example, the authentication processing may be executed by the user terminal 20 or the authentication device 30 in place of the server 10. Further, for example, when the authentication system S includes a plurality of server computers, the functions may be shared by those plurality of server computers. In addition, for example, the data described as being stored in the data storage unit 100 may be stored by a computer other than the server 10.

The invention claimed is:

1. An authentication system, comprising at least one processor configured to:
   perform first authentication based on a first authentication method;
   perform a predetermined process when the first authentication is successful;
   record, when the authentication by the first authentication method is successful, an authenticated user and a location of the authenticated user in association with each other in a storage;
   perform second authentication based on a second authentication method;
   restrict successful authentication by the second authentication method when a user to be authenticated by the second authentication method and a location of the user to be authenticated are not associated with each other in the storage, and
   perform the predetermined process when the second authentication is successful even if the first authentication is not performed when the first authentication has been previously performed for a previous authentication.

2. The authentication system according to claim 1,
   wherein, in the second authentication by the second authentication method, input authentication information and registered authentication information are compared with each other,
   wherein the at least one processor is configured to:
      acquire, as a target of comparison with the input authentication information on the user to be authenticated, the registered authentication information on users associated with the location of the user to be authenticated;
      restrict successful authentication by the second authentication method by avoiding using as the target of comparison the registered authentication information on users unassociated with the location of the user to be authenticated, and
      perform second authentication based on the input authentication information on the user to be authenticated and the registered authentication information acquired as the target of comparison.

3. The authentication system according to claim 1,
   wherein the at least one processor is configured to perform first authentication of the user to be authenticated based on the first authentication method when the authentication by the second authentication method has failed, and
   wherein the at least one processor is configured to record, when the first authentication of the first authentication method is successful, the authenticated user to be authenticated and the location of the user to be authenticated in association with each other in the storage.

4. The authentication system according to claim 1,
   wherein the at least one processor is configured to determine, when the user to be authenticated and the location of the user to be authenticated are associated with each other, whether there is a possibility that the user to be authenticated is authenticated as another user in the second authentication by the second authentication method; and wherein the at least one processor is configured to request the user to be authenticated for authentication by a third authentication method, when it is determined that there is the possibility that the user to be authenticated is authenticated as another user.

5. The authentication system according to claim 1, wherein the at least one processor is configured to record, in the storage, an area in which the user is present as the location of the user authenticated by the first authentication method, and
wherein the at least one processor is configured to restrict successful second authentication by the second authentication method when the user to be authenticated and an area in which the user to be authenticated is present are not associated with each other in the storage.

6. The authentication system according to claim 1, wherein the at least one processor is configured to perform, based on a third authentication method, third authentication of the user to be authenticated when the second authentication by the second authentication method has failed,
wherein the authenticated user to be authenticated and the location of the user to be authenticated are unassociated with each other in the storage even when the third authentication by the third authentication method is successful.

7. The authentication system according to claim 1, wherein the at least one processor is configured to receive a selection of any one of the first authentication method and the second authentication method,
wherein the at least one processor is configured to perform first authentication by the first authentication method when the first authentication method is selected, and
wherein the at least one processor is configured to perform second authentication by the second authentication method when the second authentication method is selected.

8. The authentication system according to claim 1, wherein the second authentication method includes an authentication method based on a similarity between pieces of authentication information and an authentication method based on a match between pieces of authentication information.

9. The authentication system according to claim 1, further comprising a plurality of authentication devices each corresponding to one of the first authentication method and the second authentication method,
wherein the at least one processor is configured to record, in the storage, a user authenticated by the first authentication method and a location of one of the plurality of authentication devices used in the authentication of the user in association with each other, and
wherein the at least one processor is configured to restrict successful second authentication by the second authentication method when the user to be authenticated and the location of one of the plurality of authentication devices used in the authentication of the user to be authenticated are not associated with each other.

10. The authentication system according to claim 1, wherein the first authentication by the first authentication method is authentication using a user terminal, and
wherein the second authentication by the second authentication method is biometric authentication.

11. The authentication system according to claim 1, wherein the at least one processor is configured to execute, when the first authentication by the first authentication method or the second authentication by the second authentication method is successful, payment processing based on payment information on the authenticated user.

12. The authentication system according to claim 1, wherein the second authentication method has a lower accuracy than the first authentication method.

13. The authentication system according to claim 1, wherein the first authentication method has a stricter authentication condition than the second authentication method.

14. The authentication system according to claim 2, wherein the second authentication based on the second authentication method can still be successful even if there is not a complete match between the authentication information and registered authentication information.

15. The authentication system according to claim 1, wherein the second authentication method is more convenient than the first authentication method.

16. An authentication method, comprising:
performing first authentication based on a first authentication method;
performing a predetermined process when the first authentication is successful;
recording, when the authentication by the first authentication method is successful, an authenticated user and a location of the authenticated user in association with each other in a storage;
performing second authentication based on a second authentication method;
restricting successful authentication by the second authentication method when a user to be authenticated by the second authentication method and a location of the user to be authenticated are not associated with each other in the storage and
perform the predetermined process when the second authentication is successful even if the first authentication is not performed when the first authentication has been previously performed for a previous authentication.

17. A non-transitory computer-readable information storage medium for storing a program for causing a computer to:
perform first authentication based on a first authentication method;
perform a predetermined process when the first authentication is successful;
record, when the authentication by the first authentication method is successful, an authenticated user and a location of the authenticated user in association with each other in a storage;
perform second authentication based on a second authentication method;
restrict successful authentication by the second authentication method when a user to be authenticated by the second authentication method and a location of the user to be authenticated are not associated with each other in the storage, and
perform the predetermined process when the second authentication is successful even if the first authentication is not performed when the first authentication has been previously performed for a previous authentication.

* * * * *